(12) United States Patent
Sakamine et al.

(10) Patent No.: US 9,849,344 B2
(45) Date of Patent: Dec. 26, 2017

(54) GOLF BALL

(71) Applicant: Dunlop Sports Co. Ltd., Kobe-shi, Hyogo (JP)

(72) Inventors: Ryota Sakamine, Kobe (JP); Kazuyoshi Shiga, Kobe (JP); Hikaru Nagakura, Kobe (JP); Takahiro Shigemitsu, Kobe (JP)

(73) Assignee: DUNLOP SPORTS CO. LTD., Kobe-Shi, Hyogo (JP)

( * ) Notice: Subject to any disclaimer, the term of this patent is extended or adjusted under 35 U.S.C. 154(b) by 0 days.

(21) Appl. No.: 15/229,876

(22) Filed: Aug. 5, 2016

(65) Prior Publication Data

US 2017/0036071 A1 Feb. 9, 2017

(30) Foreign Application Priority Data

Aug. 7, 2015 (JP) .................................. 2015-157464

(51) Int. Cl.
  *C08K 5/00* (2006.01)
  *A63B 37/02* (2006.01)
  (Continued)

(52) U.S. Cl.
  CPC ...... *A63B 37/0087* (2013.01); *A63B 37/0031* (2013.01); *A63B 37/0037* (2013.01);
  (Continued)

(58) Field of Classification Search
  CPC ............ A63B 37/0087; A63B 37/0065; A63B 37/0037; A63B 37/0074; A63B 37/0075;
  (Continued)

(56) References Cited

U.S. PATENT DOCUMENTS 6,231,462 B1* 5/2001 Yamagishi ............. A63B 37/00
  473/377
2002/0086742 A1* 7/2002 Yokota ............... A63B 37/0003
  473/367

(Continued)

FOREIGN PATENT DOCUMENTS

JP    59-21640 A    2/1984
JP    2003-12600 A    1/2003

(Continued)

OTHER PUBLICATIONS

Shore Durometer Conversion Chart—Thermal Tech Equipment Co. Inc.*

*Primary Examiner* — John E Simms, Jr.
(74) *Attorney, Agent, or Firm* — Birch, Stewart, Kolasch & Birch, LLP

(57) ABSTRACT

An object of the present invention is to provide a golf ball traveling a great flight distance. The present invention provides a golf ball comprising a spherical core and a cover covering the spherical core, wherein the golf ball has a ratio (t2/t1) of a time (t2) to a time (t1) of 1.05 or more in a hitting test using a driver (at a head speed of 40 m/sec), wherein the time (t1) is a time taken from a moment that the driver begins to contact with the golf ball to a moment that the golf ball reaches a maximum deformation amount, and the time (t2) is a time taken from the moment that the golf ball reaches the maximum deformation amount to a moment that the golf ball leaves the driver.

20 Claims, 5 Drawing Sheets

(51) Int. Cl.
*A63B 37/00* (2006.01)
*C08K 5/098* (2006.01)
*G01B 5/00* (2006.01)

(52) U.S. Cl.
CPC ...... *A63B 37/0039* (2013.01); *A63B 37/0043* (2013.01); *A63B 37/0049* (2013.01); *A63B 37/0051* (2013.01); *A63B 37/0062* (2013.01); *A63B 37/0063* (2013.01); *A63B 37/0065* (2013.01); *A63B 37/0074* (2013.01); *A63B 37/0075* (2013.01); *A63B 37/0077* (2013.01); *C08K 5/098* (2013.01); *G01B 5/0023* (2013.01); *A63B 37/0024* (2013.01); *A63B 2037/0079* (2013.01); *A63B 2225/02* (2013.01); *C08K 5/0025* (2013.01)

(58) Field of Classification Search
CPC ............ A63B 2037/0079; C08K 5/098; C08K 5/0025
See application file for complete search history.

(56) References Cited

U.S. PATENT DOCUMENTS

| | | | |
|---|---|---|---|
| 2004/0133023 A1* | 7/2004 | Hasegawa | C07C 51/412 556/131 |
| 2005/0059756 A1 | 3/2005 | Kim et al. | |
| 2009/0197706 A1 | 8/2009 | Yamada et al. | |
| 2009/0264223 A1* | 10/2009 | Tarao | A63B 37/0003 473/378 |
| 2011/0143865 A1* | 6/2011 | Shiga | A63B 37/0003 473/378 |
| 2011/0160000 A1* | 6/2011 | Isogawa | A63B 37/0003 473/376 |
| 2011/0244986 A1* | 10/2011 | Okabe | A63B 37/0038 473/373 |
| 2012/0172151 A1* | 7/2012 | Mikura | A63B 37/0062 473/372 |
| 2013/0172112 A1* | 7/2013 | Kanemitsu | A63B 37/0059 473/372 |
| 2013/0172115 A1* | 7/2013 | Shigemitsu | C08F 20/02 473/373 |
| 2013/0184101 A1* | 7/2013 | Inoue | A63B 37/0092 473/373 |
| 2014/0206476 A1* | 7/2014 | Sakamine | A63B 37/0054 473/372 |
| 2015/0065268 A1* | 3/2015 | Nakajima | A63B 37/006 473/373 |

FOREIGN PATENT DOCUMENTS

| | | |
|---|---|---|
| JP | 2004-504900 A | 2/2004 |
| JP | 2004-161640 A | 6/2004 |
| JP | 2006-346014 A | 12/2006 |
| JP | 2009-178447 A | 8/2009 |
| JP | 2009-254750 A | 11/2009 |
| JP | 2013-27691 A | 2/2013 |

* cited by examiner

GOLF BALL

FIELD OF THE INVENTION

The present invention relates to a golf ball.

DESCRIPTION OF THE RELATED ART

As a method for increasing a flight distance of a golf ball on driver shots, for example, a method of utilizing a core having a hardness distribution in which the hardness increases from the core center towards the core surface, is known. A core having such a hardness distribution shows a high launch angle and a low spin rate. A golf ball showing a high launch angle and a low spin rate travels a great flight distance. As a golf ball comprising a core having such a hardness distribution, for example, a golf ball comprising a spherical core formed from a rubber composition containing a base rubber, a co-crosslinking agent, a crosslinking initiator, and a salt of a carboxylic acid having 1 to 13 carbon atoms, has been proposed (refer to claim 1 of Japanese Patent Publication No. 2013-027691 A).

The rubber composition used for a core of a golf ball usually contains zinc acrylate as a co-crosslinking agent. A technology for improving zinc acrylate has been proposed. For example, Japanese Patent Publication No. 2003-12600 A discloses a zinc acrylate composition containing zinc acrylate and an anionic surfactant, wherein in the zinc acrylate, particles having a particle size of 300 μm or more measured by a dry method is included in a ratio of 20 mass % or less, a particle size measured by dry method has a median value ranging from 10 to 300 μm, and a ratio of the median value (A) of the particle size measured by a dry method to a median value (B) of a particle size measured by a wet method exceeds 2 (refer to claim 1 of Japanese Patent Publication No. 2003-12600 A). Japanese Patent Publication No. 2004-161640 A discloses a production method of zinc acrylate, comprising dispersing zinc oxide in any one of an aliphatic hydrocarbon solvent, a mixed solvent containing an aliphatic hydrocarbon solvent and an aromatic hydrocarbon solvent, or a mixed solvent containing an aromatic hydrocarbon solvent and an alcohol, and reacting acrylic acid with zinc oxide in the solvent (refer to claim 1 of Japanese Patent Publication No. 2004-161640 A). Japanese Patent Publication No. S59-21640 A discloses a production method of zinc acrylate, comprising reacting acrylic acid with a zinc compound, and then adding stearic acid into the reaction liquid (refer to claims of Japanese Patent Publication No. S59-21640 A).

In addition, a method of adding a filler such as an organic short fiber, a metal and a clay mineral, in addition to a resin component, into a golf ball constituent member to improve the golf ball performance, has also been proposed. For example, Japanese Patent Publication No. 2004-504900 A discloses a golf ball comprising a nanocomposite material, wherein the nanocomposite material is formed from a polymer having a structure in which inorganic material particles are reacted and substantially evenly dispersed, and wherein each of the particles has a largest particle size that is about 1 μm or less and that is at least an order of magnitude greater than such particle's smallest particle size (refer to claim 1 of Japanese Patent Publication No. 2004-504900 A). Japanese Patent Publications No. 2006-346014 A, No. 2009-178447 A, and 2009-254750 A disclose a golf ball comprising a cover containing a cation-treated layered silicate, a (meth) acrylic polymer modified silicate or an organically modified layered silicate (refer to claim 5 of Japanese Patent Publication No. 2006-346014 A, claim 1 of Japanese Patent Publication No. 2009-178447 A, and claim 1 of Japanese Patent Publication 2009-254750 A).

SUMMARY OF THE INVENTION

An object of the present invention is to provide a golf ball traveling a great flight distance on driver shots.

The present invention provides a golf ball comprising a spherical core and a cover covering the spherical core, wherein the golf ball has a ratio ($t2/t1$) of a time ($t2$) to a time ($t1$) of 1.05 or more in a hitting test using a driver (at a head speed of 40 m/sec), wherein the time ($t1$) is a time taken from a moment that the driver begins to contact with the golf ball to a moment that the golf ball reaches a maximum deformation amount, and the time ($t2$) is a time taken from the moment that the golf ball reaches the maximum deformation amount to a moment that the golf ball leaves the driver.

The golf ball according to the present invention travels a great flight distance on driver shots.

DESCRIPTION OF THE PREFERRED EMBODIMENT

Figure 1:
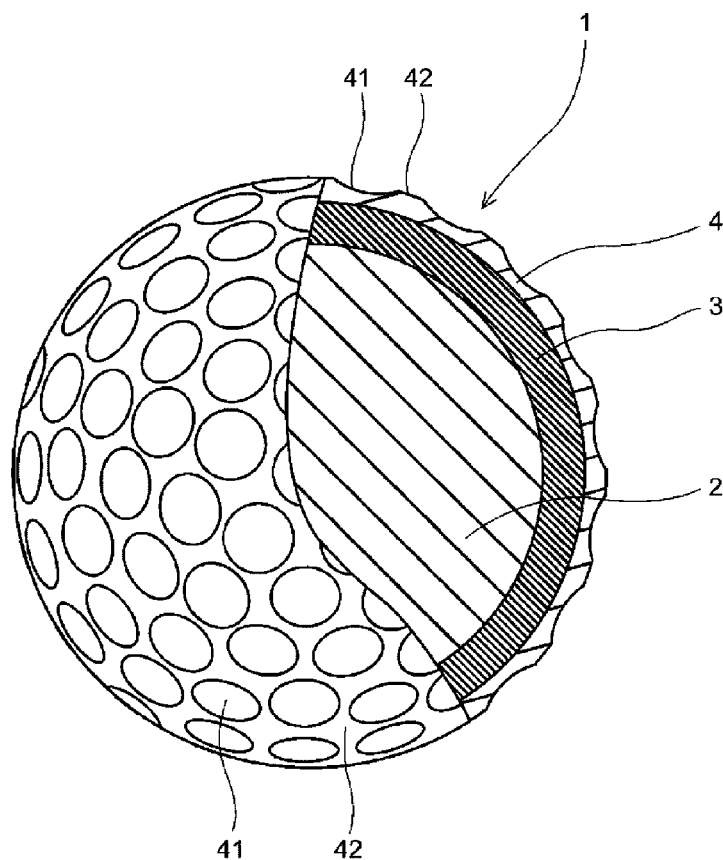
FIG. 1 is a partially cutaway cross-sectional view of a golf ball of one embodiment according to the present invention.
Figure 2:
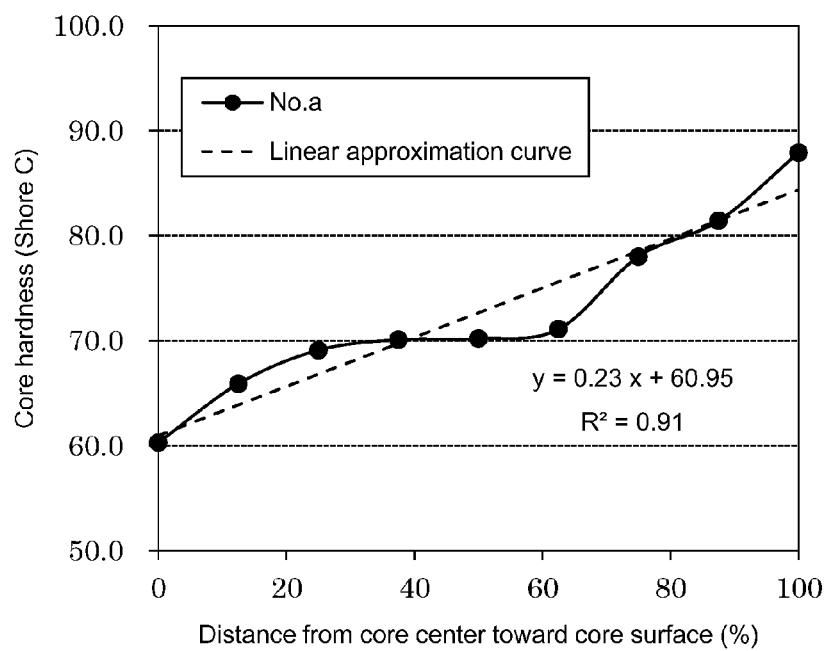
FIG. 2 is a graph showing a hardness distribution of a core.
Figure 3:
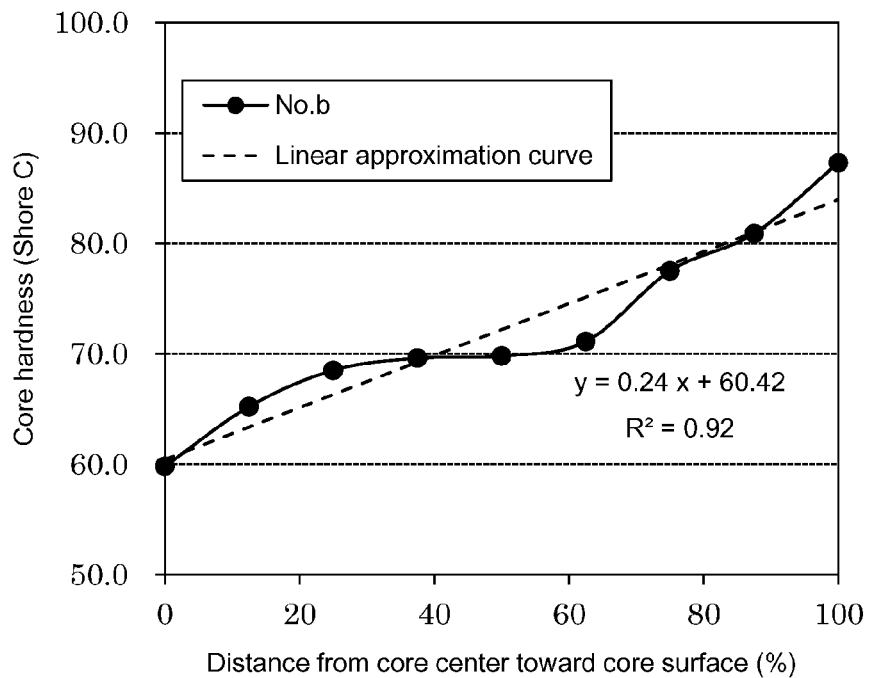
FIG. 3 is a graph showing a hardness distribution of a core.
Figure 4:
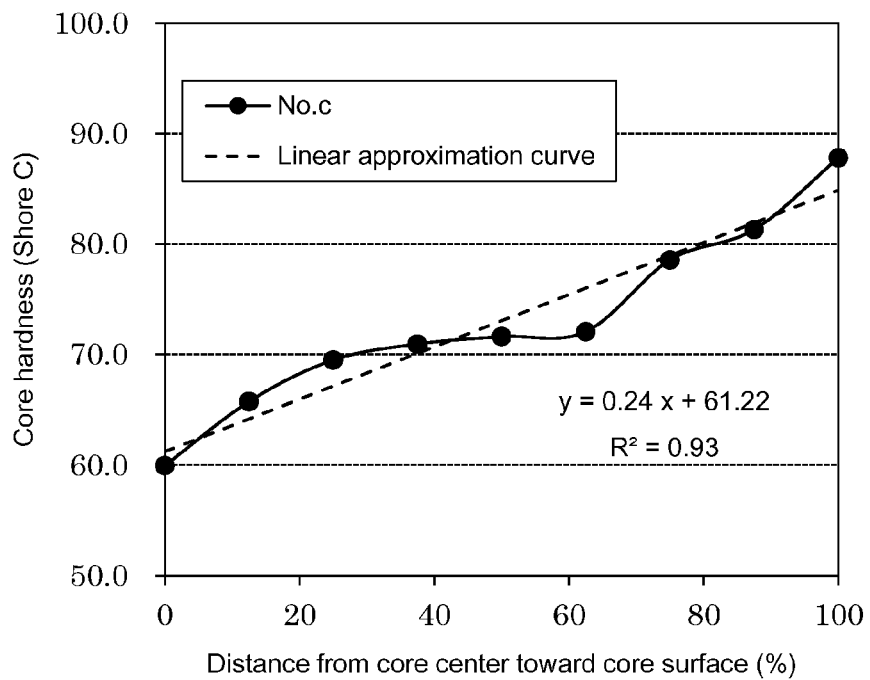
FIG. 4 is a graph showing a hardness distribution of a core.
Figure 5:
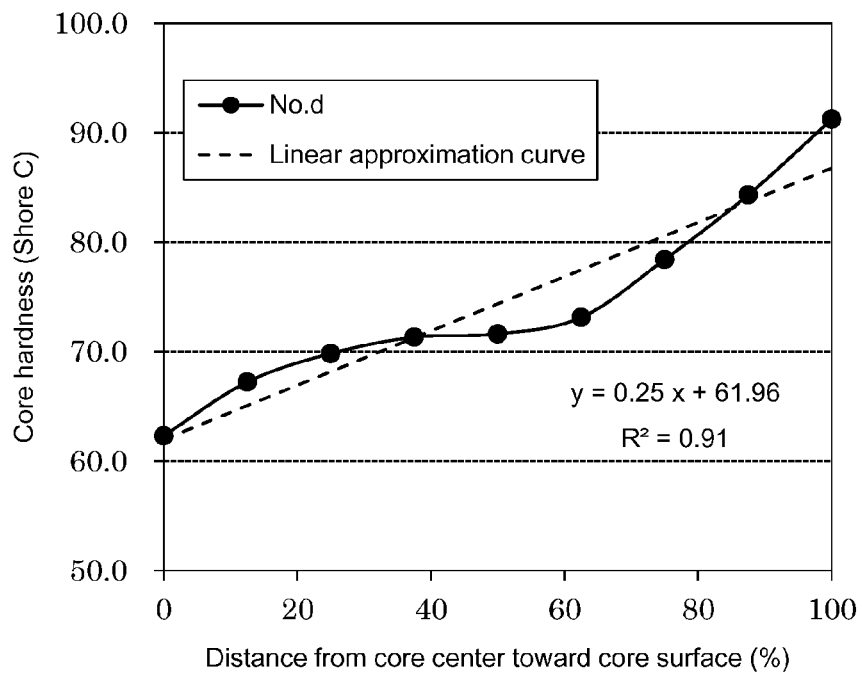
FIG. 5 is a graph showing a hardness distribution of a core.
Figure 6:
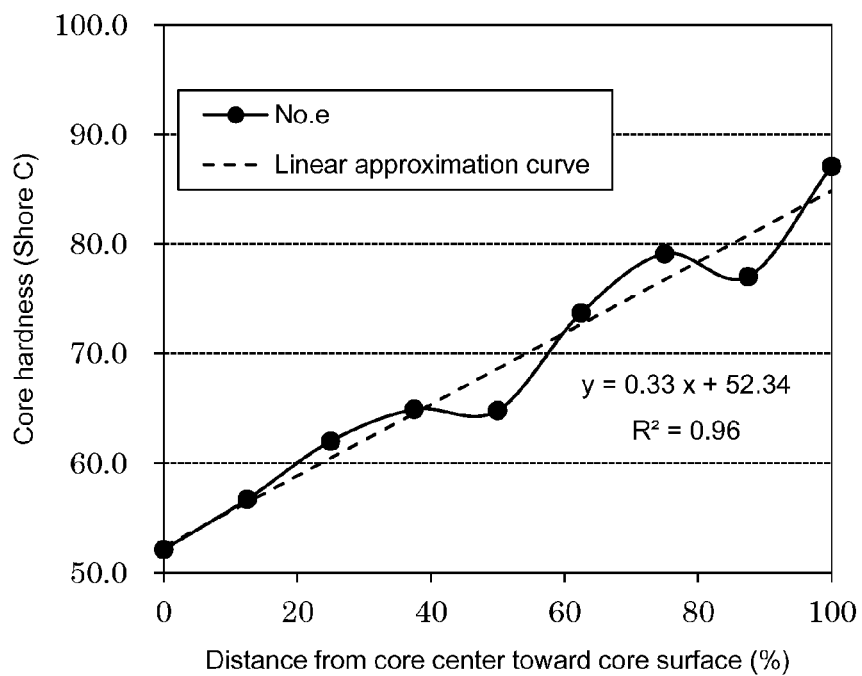
FIG. 6 is a graph showing a hardness distribution of a core.
Figure 7:
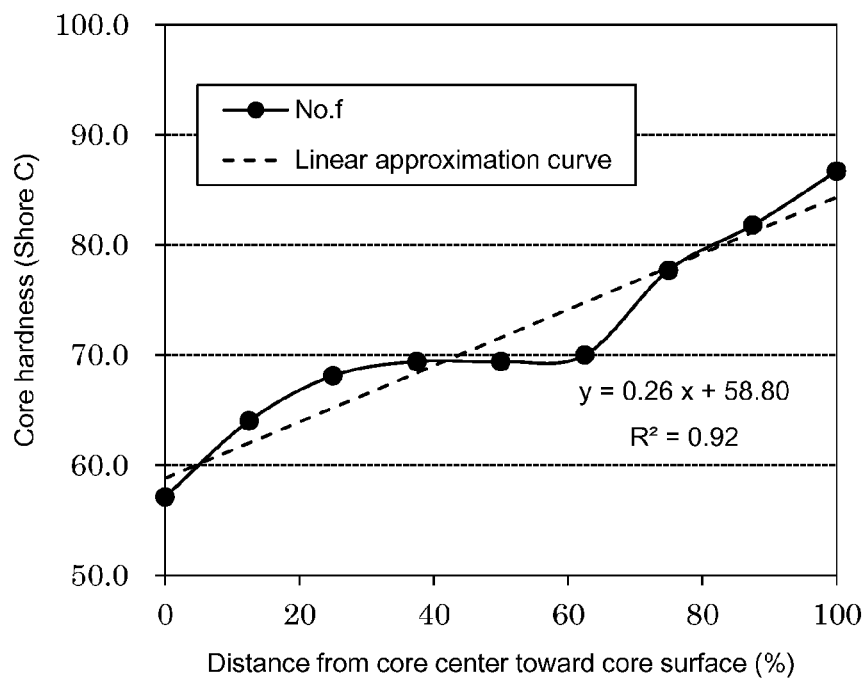
FIG. 7 is a graph showing a hardness distribution of a core.
Figure 8:
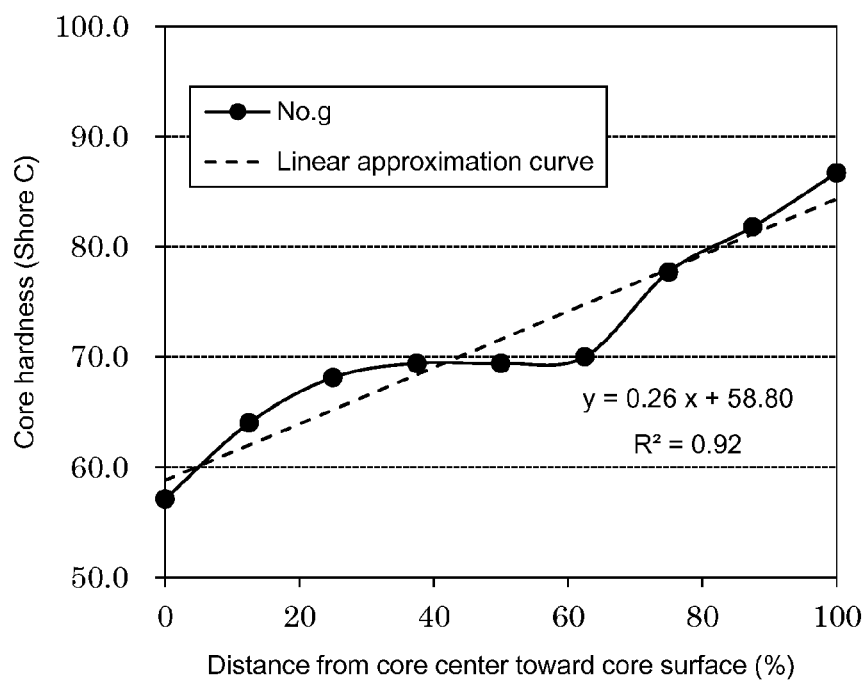
FIG. 8 is a graph showing a hardness distribution of a core.
Figure 9:
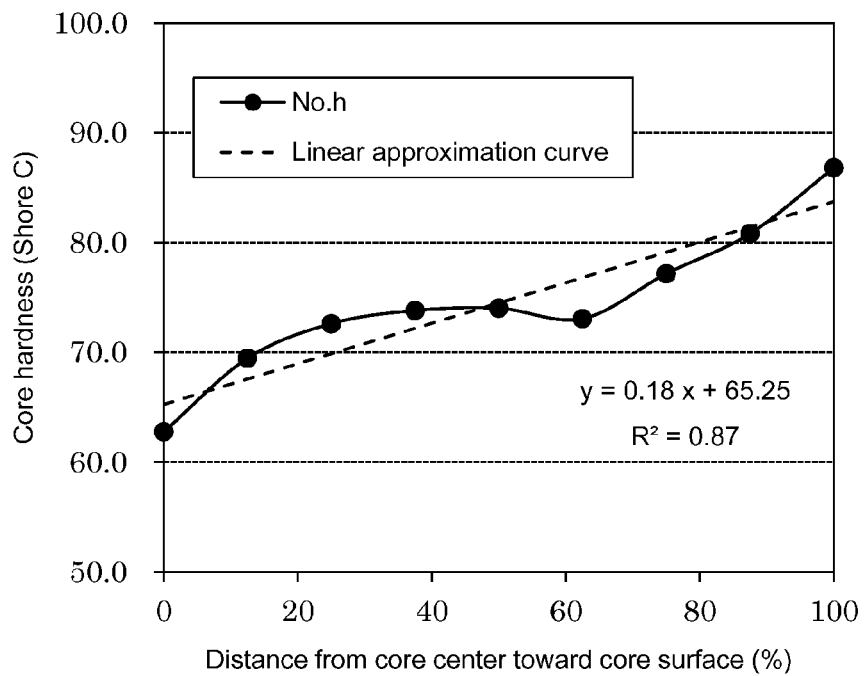
FIG. 9 is a graph showing a hardness distribution of a core.
Figure 10:
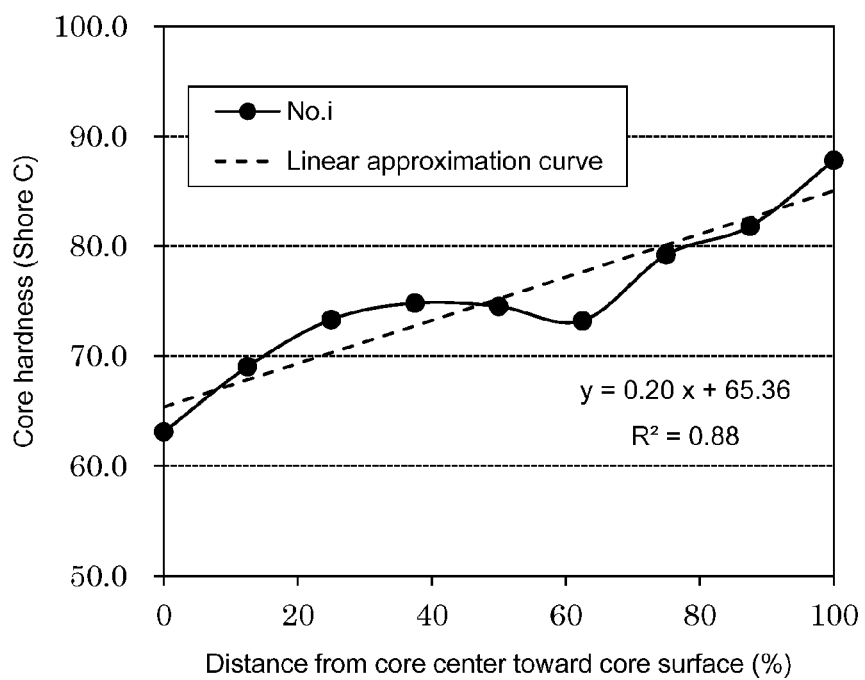
FIG. 10 is a graph showing a hardness distribution of a core.

The present invention provides a golf ball comprising a spherical core and a cover covering the spherical core, wherein the golf ball has a ratio ($t2/t1$) of a time ($t2$) to a time ($t1$) of 1.05 or more in a hitting test using a driver (at a head speed of 40 m/sec), wherein the time ($t1$) is a time taken from a moment that the driver begins to contact with the golf ball to a moment that the golf ball reaches a maximum deformation amount, and the time ($t2$) is a time taken from the moment that the golf ball reaches the maximum deformation amount to a moment that the golf ball leaves the driver.

The time $t1$ is preferably 150 μsec or more, more preferably 190 μsec or more, even more preferably 200 μsec or more, and is preferably 400 μsec or less, more preferably 300 μsec or less, even more preferably 250 μsec or less. If the time $t1$ is 150 μsec or more, the golf ball has better shot feeling, and if the time $t1$ is 400 μsec or less, the golf ball has better resilience.

The time t2 is preferably 150 μsec or more, more preferably 200 μsec or more, even more preferably 250 μsec or more, and is preferably 450 μsec or less, more preferably 350 μsec or less, even more preferably 310 μsec or less. If the time t2 is 150 μsec or more, the golf ball has better shot feeling, and if the time t2 is 450 μsec or less, the golf ball has better resilience.

The time ratio (t2/t1) is preferably 1.05 or more, more preferably 1.10 or more, even more preferably 1.15 or more, and is preferably 3.0 or less, more preferably 2.0 or less, even more preferably 1.5 or less. If the time ratio (t2/t1) is 1.05 or more, the golf ball travels a greater flight distance on driver shots, and if the time ratio (t2/t1) is 3.0 or less, the golf ball has better shot feeling.

The total time (contact time t) of the time t1 and the time t2 is preferably 200 μsec or more, more preferably 300 μsec or more, even more preferably 400 μsec or more, and is preferably 700 μsec or less, more preferably 600 μsec or less, even more preferably 550 μsec or less. If the contact time t is 200 μsec or more, the golf ball has better shot feeling, and if the contact time t is 700 μsec or less, the golf ball has better resilience.

The golf ball preferably has a diameter ranging from 40 mm to 45 mm. In light of satisfying the regulation of US Golf Association (USGA), the diameter is most preferably 42.67 mm or more. In light of prevention of air resistance, the diameter is more preferably 44 mm or less, and most preferably 42.80 mm or less. In addition, the golf ball preferably has a mass of 40 g or more and 50 g or less. In light of obtaining greater inertia, the mass is more preferably 44 g or more, and most preferably 45.00 g or more. In light of satisfying the regulation of USGA, the mass is most preferably 45.93 g or less.

When the golf ball has a diameter in a range from 40 mm to 45 mm, the compression deformation amount (shrinking amount along the compression direction) of the golf ball when applying a load from an initial load of 98 N to a final load of 1275 N to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard, and thus has better shot feeling. On the other hand, if the compression deformation amount is 4.0 mm or less, the golf ball has better resilience.

[Spherical Core]

The spherical core may have a single-layered construction or a multi-layered construction composed of at least two layers. The spherical core preferably has a single-layered construction. Unlike the multi-layered spherical core, the single-layered spherical core does not have an energy loss at the interface of the multi-layered construction when being hit, and thus has better resilience. The spherical core is preferably formed from a rubber composition.

The center hardness Ho of the spherical core is preferably 35 or more, more preferably 40 or more, even more preferably 45 or more in Shore C hardness. If the spherical core has a center hardness Ho of 35 or more in Shore C hardness, the spherical core does not become excessively soft, and thus has better resilience. In addition, the center hardness Ho of the spherical core is preferably 65 or less, more preferably 62 or less, even more preferably 61 or less in Shore C hardness. If the spherical core has a center hardness Ho of 65 or less in Shore C hardness, the spherical core does not become excessively hard, and thus has better shot feeling.

The surface hardness Hs of the spherical core is preferably 75 or more, more preferably 77 or more, even more preferably 80 or more, and is preferably 95 or less, more preferably 93 or less, even more preferably 91 or less in Shore C hardness. If the spherical core has a surface hardness of 75 or more in Shore C hardness, the spherical core does not become excessively soft, and thus has better resilience. In addition, if the spherical core has a surface hardness of 95 or less in Shore C hardness, the spherical core does not become excessively hard, and thus has better shot feeling.

The hardness difference (Hs−Ho) between the surface hardness Hs and the center hardness Ho of the spherical core is preferably 15 or more, more preferably 17 or more, even more preferably 20 or more, and is preferably 50 or less, more preferably 40 or less, even more preferably 35 or less in Shore C hardness. If the hardness difference is large, the golf ball showing a higher launch angle and a lower spin rate, thereby travelling a greater flight distance can be obtained.

If a hardness is measured in the spherical core of the golf ball according to the present invention at nine points, including a core center and a core surface, obtained by dividing a radius of the spherical core into equal parts having 12.5% intervals therebetween, and is plotted against a distance from the core center, the coefficient of determination $R^2$ of a linear approximation curve obtained from a least square method is preferably 0.80 or more. If $R^2$ is 0.80 or more, the linearity of the core hardness distribution is enhanced, and thus the spin rate on driver shots is lowered, resulting in the enhanced flight distance performance.

The hardness of the spherical core is Shore C hardness measured in the spherical core at nine points, including a core center and a core surface, obtained by dividing a radius of the spherical core into equal parts having 12.5% intervals therebetween. That is, Shore C hardness is measured at nine points, namely at a distance of 0% (core center), 12.5%, 25%, 37.5%, 50%, 62.5%, 75%, 87.5% and 100% (core surface) from the core center. Next, the measurement results are plotted to make a graph having the Shore C hardness measured above as a vertical axis and the distance (%) from the core center as a horizontal axis. In the present invention, $R^2$ of a linear approximation curve obtained from this graph by a least square method is preferably 0.80 or more. $R^2$ of the linear approximation curve obtained from the least square method indicates the linearity of the obtained plot. In the present invention, $R^2$ of 0.80 or more means that the spherical core has an approximately linear hardness distribution. If the spherical core having an approximately linear hardness distribution is used, the resultant golf ball has a lowered spin rate on driver shots. As a result, the golf ball travels a greater flight distance on driver shots. $R^2$ of the linear approximation curve is more preferably 0.90 or more. A higher linearity provides a greater flight distance on driver shots.

$R^2$ of the linear approximation curve is a parameter showing the deviation between the hardness value calculated from the approximation curve and the measured value. The value of $R^2$ nearer to 1 means a smaller deviation. When the linear approximation curve is expressed by the Formula (1), $R^2$ is calculated according to Formulae (2) to (4).

$$f(x) = ax + b \tag{1}$$

$$R^2 = 1 - \frac{\sum_i (y_i - f_i)^2}{\sum_i (y_i - \bar{y})^2} \tag{2}$$

-continued $$f_i = ax_i + b \quad (3)$$

$$\bar{y} = \frac{1}{9}\sum_{i=1}^{9} y_i \quad (4)$$

The diameter of the spherical core is preferably 34.8 mm or more, more preferably 36.8 mm or more, even more preferably 38.8 mm or more, and is preferably 42.2 mm or less, more preferably 41.8 mm or less, even more preferably 41.2 mm or less, most preferably 40.8 mm or less. If the spherical core has a diameter of 34.8 mm or more, the thickness of the cover does not become excessively thick, and thus the resilience of the golf ball is better. On the other hand, if the spherical core has a diameter of 42.2 mm or less, the cover does not become excessively thin, and thus the cover functions better.

When the spherical core has a diameter in a range from 34.8 mm to 42.2 mm, the compression deformation amount (shrinking amount along the compression direction) of the spherical core when applying a load from an initial load of 98 N to a final load of 1275 N to the spherical core is preferably 2.0 mm or more, more preferably 2.8 mm or more, and is preferably 6.0 mm or less, more preferably 5.0 mm or less. If the compression deformation amount is 2.0 mm or more, the shot feeling is better, and if the compression deformation amount is 6.0 mm or less, the resilience is better.

[Cover]

The cover may be composed of a single-layer or composed of at least two layers. It is preferred that at least one layer of the cover is formed from a first resin composition.

The slab hardness of the first resin composition is preferably 35 or more, more preferably 40 or more, even more preferably 45 or more, and is preferably 65 or less, more preferably 60 or less, even more preferably 56 or less in Shore D hardness. If the slab hardness is 35 or more, the golf ball has better resilience since the golf ball deforms a little when being hit and the hitting energy can be efficiently converted to accelerate the golf ball. In addition, if the slab hardness is 65 or less, the golf ball has better shot feeling since the impact when hitting the golf ball can be suppressed.

The bending stiffness ($M_{3-12}$) of the first resin composition is preferably 500 kgf/cm$^2$ (49.0 MPa) or more, more preferably 600 kgf/cm$^2$ (58.8 MPa) or more, even more preferably 700 kgf/cm$^2$ (68.6 MPa) or more, most preferably 1000 kgf/cm$^2$ (98.1 MPa) or more, and is preferably 6000 kgf/cm$^2$ (588 MPa) or less, more preferably 5500 kgf/cm$^2$ (539 MPa) or less, even more preferably 5000 kgf/cm$^2$ (490 MPa) or less. If the bending stiffness is 500 kgf/cm$^2$ or more, the golf ball has better resilience since the golf ball deforms a little when being hit and the hitting energy can be efficiently converted to accelerate the golf ball. In addition, if the bending stiffness is 6000 kgf/cm$^2$ or less, the golf ball has better shot feeling since the flexibility is better and the impact when hitting the golf ball can be suppressed.

The thickness of the cover is preferably 0.3 mm or more, more preferably 0.5 mm or more, even more preferably 0.8 mm or more, and is preferably 4.0 mm or less, more preferably 3.0 mm or less, even more preferably 2.0 mm or less. If the cover has a thickness of 0.3 mm or more, the cover functions better, and if the cover has a thickness of 4.0 mm or less, the core has a relatively large diameter, and thus the golf ball has better resilience.

The cover of the golf ball is preferably composed of at least two layers. If the cover includes at least two layers, properties of the golf ball can be easily controlled. When the cover includes at least two layers, it is preferred that the outermost cover is formed from a second resin composition, and at least one layer of the cover other than the outermost cover is formed from the first resin composition.

When the cover includes at least two layers, the thickness of the cover formed from the first resin composition is preferably 0.3 mm or more, more preferably 0.5 mm or more, even more preferably 0.8 mm or more, and is preferably 2.0 mm or less, more preferably 1.5 mm or less, even more preferably 1.2 mm or less. If the cover formed from the first resin composition has a thickness of 0.3 mm or more, the cover functions better, and if the cover formed from the first resin composition has a thickness of 2.0 mm or less, the core has a relatively large diameter, and thus the golf ball has better resilience.

The slab hardness of the second resin composition is preferably 10 or more, more preferably 15 or more, even more preferably 20 or more, and is preferably 45 or less, more preferably 40 or less, even more preferably 35 or less in Shore D hardness. If the outermost cover has a slab hardness of 10 or more, the golf ball has better resilience since the golf ball deforms a little when being hit and the hitting energy can be efficiently converted to accelerate the golf ball. In addition, if the outermost cover has a slab hardness of 45 or less, the golf ball has better shot feeling since the impact when hitting the golf ball can be suppressed.

The thickness of the outermost cover is preferably 0.1 mm or more, more preferably 0.2 mm or more, even more preferably 0.3 mm or more, and is preferably 1.0 mm or less, more preferably 0.8 mm or less, even more preferably 0.6 mm or less. If the outermost cover has a thickness of 0.1 mm or more, the cover functions better, and if the outermost cover has a thickness of 1.0 mm or less, the core has a relatively large diameter, and thus the golf ball has better resilience.

The construction of the golf ball according to the present invention is not particularly limited, as long as the golf ball comprises a spherical core and a cover covering the spherical core. Examples of the golf ball include: a two-piece golf ball having a single-layered spherical core and a single-layered cover disposed around the spherical core; a three-piece golf ball having a dual-layered spherical core and a single-layered cover disposed around the spherical core; a three-piece golf ball having a single-layered spherical core, an inner cover disposed around the spherical core, and an outer cover disposed around the inner cover; a four-piece golf ball having a dual-layered spherical core, an inner cover disposed around the spherical core, and an outer cover disposed around the inner cover; a golf ball having at least four pieces, i.e. a single-layered spherical core and at least three cover layers disposed around the spherical core; and a golf ball having at least five pieces, i.e. a dual-layered spherical core and at least three cover layers disposed around the spherical core. The present invention can be suitably applied to any one of the above golf balls.

It is preferred that the golf ball according to the present invention has a single-layered core, an inner cover and an outermost cover, and at least one layer of the inner cover is formed from the first resin composition.

FIG. 1 is a partially cutaway cross-sectional view of a golf ball 1 of one embodiment according to the present invention. The golf ball 1 has a spherical core 2, an inner cover 3 covering the spherical core 2, and an outermost cover 4 covering the inner cover 3. A plurality of dimples 41 are formed on the surface of the outermost cover 4. Other portions than dimples 41 on the surface of the golf ball 1 are land 42. The golf ball 1 is provided with a paint layer and a mark layer outside the outermost cover 4, but these layers are not depicted.

[Core Material]

A conventional rubber composition (hereinafter, sometimes merely referred to as "rubber composition"), for example, a rubber composition containing (a) a base rubber, (b) a co-crosslinking agent and (c) a crosslinking initiator, can be used to form the spherical core.

((a) Base Rubber)

As (a) the base rubber, a natural rubber and/or a synthetic rubber can be used. For example, a polybutadiene rubber, a natural rubber, a polyisoprene rubber, a styrene polybutadiene rubber, an ethylene-propylene-diene rubber (EPDM), or the like can be used. These rubbers may be used solely, or at least two of these rubbers may be used in combination. Among them, typically preferred is a high cis-polybutadiene having a cis-1,4-bond in a proportion of 40 mass % or more, preferably 80 mass % or more, more preferably 90 mass % or more in view of its superior resilience.

((b) Co-Crosslinking Agent)

(b) The α,β-unsaturated carboxylic acid having 3 to 8 carbon atoms and/or the metal salt thereof is blended as a co-crosslinking agent in the rubber composition and has an action of crosslinking a rubber molecule by graft polymerization to a base rubber molecular chain. Examples of the α,β-unsaturated carboxylic acid having 3 to 8 carbon atoms preferably include acrylic acid, methacrylic acid, fumaric acid, maleic acid and crotonic acid. Among them, acrylic acid and methacrylic acid are preferred.

Examples of the metal ion constituting the metal salt of the α,β-unsaturated carboxylic acid having 3 to 8 carbon atoms include: a monovalent metal ion such as sodium, potassium and lithium; a divalent metal ion such as magnesium, calcium, zinc, barium and cadmium; a trivalent metal ion such as aluminum; and other metal ion such as tin and zirconium. The above metal component may be used solely or as a mixture of at least two of them. Among them, the divalent metal ion such as magnesium, calcium, zinc, barium and cadmium is preferably used as the metal component. This is because if the divalent metal salt of the α,β-unsaturated carboxylic acid having 3 to 8 carbon atoms is used, a metal crosslinking easily generates between the rubber molecules. Especially, as the divalent metal salt, a zinc salt is preferable, and zinc acrylate is more preferable because zinc acrylate enhances the resilience of the obtained golf ball. The α,β-unsaturated carboxylic acid having 3 to 8 carbon atoms and/or the metal salt thereof may be used solely or as a mixture of at least two of them.

The amount of (b) the α,β-unsaturated carboxylic acid having 3 to 8 carbon atoms and/or the metal salt thereof in the rubber composition is preferably 15 parts by mass or more, more preferably 20 parts by mass or more, and is preferably 50 parts by mass or less, more preferably 45 parts by mass or less, even more preferably 35 parts by mass or less, with respect to 100 parts by mass of (a) the base rubber. If the amount of (b) the α,β-unsaturated carboxylic acid having 3 to 8 carbon atoms and/or the metal salt thereof is less than 15 parts by mass, the amount of (c) the crosslinking initiator which will be described later must be increased such that the constituent member formed from the rubber composition has an appropriate hardness, which tends to lower the resilience of the golf ball. On the other hand, if the amount of (b) the α,β-unsaturated carboxylic acid having 3 to 8 carbon atoms and/or the metal salt thereof exceeds 50 parts by mass, the constituent member formed from the rubber composition becomes so hard that the shot feeling of the golf ball may be lowered.

((b1) Co-Crosslinking Agent Powder)

(b) The α,β-unsaturated carboxylic acid having 3 to 8 carbon atoms and/or the metal salt thereof is preferably (b1) a powder of an α,β-unsaturated carboxylic acid having 3 to 8 carbon atoms and/or a metal salt thereof (hereinafter, sometimes referred to as "(b1) co-crosslinking agent powder").

The mode particle size of (b1) the co-crosslinking agent powder is preferably larger than 10 μm and 50 μm or less. The mode particle size is a particle size having maximum value (most frequent value) in the volume based frequency distribution graph. The mode particle size is preferably larger than 10 μm, more preferably 13 μm or more, even more preferably 15 μm or more. In addition, the mode particle size is preferably 50 μm or less, more preferably 45 μm or less, even more preferably 40 μm or less. If the mode particle size falls within the above range, (b1) the co-crosslinking agent powder has better kneadability, and thus the resultant golf ball constituent member (especially when it is a spherical core) has a greater degree of the outer-hard and inner-soft structure. As a result, the obtained golf ball has a low spin rate on driver shots and hence travels a greater flight distance.

In (b1) the co-crosslinking agent powder, the volume ratio ($V_{6-300}$) of the particles having a particle size in a range from 6 μm to 300 μm is preferably 60% or more. The volume ratio ($V_{6-300}$) is a value obtained by subtracting a cumulative volume ratio V % (6 μm) at the particle size of 6 μm from a cumulative volume ratio V % (300 μm) at the particle size of 300 μm in the volume based cumulative distribution graph (the fine particle size side is 0%, and the coarse particle size side is 100%). The volume ratio ($V_{6-300}$ is more preferably 65% or more. If the volume ratio ($V_{6-300}$) is less than 60%, the ratio of the fine particles having a particle size smaller than 6 μm or the coarse particles having a particle size larger than 300 μm increases. As a result, the resultant rubber composition may not be kneaded uniformly. In addition, when the spherical core is formed from the rubber composition, the outer-hard and inner-soft degree thereof may be lowered.

The d10 of (b1) the co-crosslinking agent powder is preferably 6 μm or more. The d10 is a particle size (μm) whose cumulative volume ratio V % is 10% in the volume based cumulative distribution graph. The d10 is preferably 6.5 μm or more. If the d10 is less than 6 μm, the ratio of the fine particles having a particle size smaller than 6 μm increases, and when the spherical core is formed from the rubber composition, the outer-hard and inner-soft degree thereof may be lowered. The upper limit of the d10 is not particularly limited, and is preferably 15 μm, more preferably 12 μm.

In (b1) the co-crosslinking agent powder, the volume ratio ($V_{0-200}$) of the particles having a particle size of 200 μm or less is preferably 75% or more. The volume ratio ($V_{0-200}$) is preferably 75% or more, more preferably 76% or more. If the volume ratio ($V_{0-200}$) is 75% or more, the ratio of the coarse particles having a particle size larger than 200 μm decreases, and thus it becomes easier to knead the rubber composition uniformly. The volume ratio ($V_{0-200}$) is not particularly limited, and is preferably 98% or less, more preferably 95% or less.

The specific surface area of (b1) the co-crosslinking agent powder is preferably 0.1 $m^2/g$ or more, more preferably 0.2 m²/g or more, even more preferably 0.25 m²/g or more, and is preferably 1.5 m²/g or less, more preferably 1.0 m²/g or less, even more preferably 0.8 m²/g or less. If the specific surface area falls within the above range, (b1) the co-crosslinking agent powder has better kneadability, and thus the resultant golf ball constituent member (especially when it is a spherical core) has a greater degree of the outer-hard and inner-soft structure.

The mode particle size, d10, volume ratio and specific surface area are measured or calculated by the following methods. Specifically, a dry powder sample is set into a dry-type unit of a laser diffraction particle size analyzer (type: LMS-2000e, available from Seishin Enterprise Co., Ltd.), the refractive index of the sample is set as 1.52, and then measurement is conducted. Based on the obtained volume based frequency distribution graph and the cumulative distribution graph, the mode particle size and the volume ratio of the particles are calculated.

Sometimes, (b1) the crosslinking agent powder is treated with a fatty acid and/or a salt thereof to improve the processability thereof in the rubber composition. In this case, it is preferred that (b1) the crosslinking agent powder before the treatment with the fatty acid and/or the salt thereof satisfies the above mentioned requirements.

(b1) The crosslinking agent powder may be obtained by pulverizing and classifying the α,β-unsaturated carboxylic acid having 3 to 8 carbon atoms and/or the metal salt thereof. The pulverization method is not particularly limited, and examples thereof include a pulverization method using a jet mill, ball mill or stamp mill. In addition, examples of the classification method include a classification method based on an air flow and a classification method based on a sieve.

It is preferred that (b1) the crosslinking agent powder is coated with the fatty acid and/or the salt thereof. The fatty acid is not particularly limited, and a fatty acid having 10 to 30 carbon atoms is preferable, a fatty acid having 10 to 20 carbon atoms is more preferable. The fatty acid may be a saturated fatty acid or an unsaturated fatty acid. Suitable examples of the fatty acid and/or the salt thereof include stearic acid, oleic acid, zinc stearate, and zinc oleate.

The amount of the fatty acid and/or the salt thereof in (b1) the crosslinking agent powder treated with the fatty acid and/or the salt thereof is preferably 1 mass % or more, more preferably 5 mass % or more, even more preferably 10 mass % or more, and is preferably 20 mass % or less, more preferably 15 mass % or less.

((c) Crosslinking Initiator)

(c) The crosslinking initiator is blended to crosslink (a) the base rubber component. As (c) the crosslinking initiator, an organic peroxide is suitable. Specific examples of the organic peroxide include dicumyl peroxide, 1,1-bis(t-butylperoxy)-3,3,5-trimethylcyclohexane, 2,5-dimethyl-2,5-di(t-butylperoxy)hexane and di-t-butyl peroxide. These organic peroxides may be used solely or as a mixture of at least two of them. Among them, dicumyl peroxide is preferably used.

The amount of (c) the crosslinking initiator is preferably 0.2 part by mass or more, more preferably 0.5 part by mass or more, and is preferably 5.0 parts by mass or less, more preferably 2.5 parts by mass or less, with respect to 100 parts by mass of (a) the base rubber. If the amount of (c) the crosslinking initiator is less than 0.2 part by mass, the constituent member formed from the rubber composition is so soft that the resilience of the golf ball tends to be lowered. In addition, if the amount of (c) the crosslinking initiator exceeds 5.0 parts by mass, the amount of (b) the co-crosslinking agent described above must be decreased such that the constituent member formed from the rubber composition has an appropriate hardness, which tends to lower the resilience or worsen the durability of the golf ball.

((d) Metal Compound)

In the case that the rubber composition contains only the α,β-unsaturated carboxylic acid having 3 to 8 carbon atoms as the co-crosslinking agent, the rubber composition preferably further contains (d) a metal compound. (d) The metal compound is not particularly limited, as long as (d) the metal compound can neutralize (b) the α,β-unsaturated carboxylic acid having 3 to 8 carbon atoms in the rubber composition. Examples of (d) the metal compound include: a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. As (d) the metal compound, a divalent metal compound is preferable, a zinc compound is more preferable. This is because the divalent metal compound reacts with the α,β-unsaturated carboxylic acid having 3 to 8 carbon atoms and forms a metal crosslinking. In addition, if the zinc compound is used, the golf ball having better resilience is obtained. (d) The metal compound may be used solely or as a mixture of at least two of them.

((e) Carboxylic Acid and/or Salt Thereof)

The rubber composition may further contain (e) a carboxylic acid and/or a salt thereof. If (e) the carboxylic acid and/or the salt thereof is contained, the obtained spherical core has a higher degree of an outer-hard and inner-soft structure. Examples of (e) the carboxylic acid and/or the salt thereof include an aliphatic carboxylic acid, a salt of an aliphatic carboxylic acid, an aromatic carboxylic acid, and a salt of an aromatic carboxylic acid. (e) The carboxylic acid and/or the salt thereof may be used solely or as a mixture of at least two of them. As (e) the carboxylic acid and/or the salt thereof, a carboxylic acid having 1 to 30 carbon atoms and/or a salt thereof is preferable, a carboxylic acid having 4 to 30 carbon atoms and/or a salt thereof is more referable, a carboxylic acid having 5 to 25 carbon atoms and/or a salt thereof is even more preferable. It should be noted that (b) the α,β-unsaturated carboxylic acid having 3 to 8 carbon atoms and/or the metal salt thereof used as the co-crosslinking agent is excluded from (e) the carboxylic acid and/or the salt thereof.

Examples of (e) the aliphatic carboxylic acid and/or the salt thereof include a saturated fatty acid and/or a salt thereof, and an unsaturated fatty acid and/or a salt thereof. Preferable examples of the saturated fatty acid and/or the salt thereof include caprylic acid (octanoic acid), pelargonic acid (nonanoic acid), capric acid (decanoic acid), lauric acid, myristic acid, palmitic acid, stearic acid, behenic acid or oleic acid, and potassium salt, magnesium salt, calcium salt, aluminum salt, zinc salt, iron salt, copper salt, nickel salt, cobalt salt thereof. Preferable examples of the unsaturated fatty acid and/or the salt thereof include palmitoleic acid, oleic acid, linoleic acid, arachidonic acid, and potassium salt, magnesium salt, calcium salt, aluminum salt, zinc salt, iron salt, copper salt, nickel salt, cobalt salt thereof.

Preferable examples of (e) the aromatic carboxylic acid and/or the salt thereof include benzoic acid, butylbenzoic acid, anisic acid (methoxybenzoic acid), dimethoxybenzoic acid, trimethoxybenzoic acid, dimethylaminobenzoic acid, chlorobenzoic acid, dichlorobenzoic acid, trichlorobenzoic acid, acetoxybenzoic acid, biphenylcarboxylic acid, naphthalenecarboxylic acid, anthracenecarboxylic acid, furancarboxylic acid, thenoic acid, and potassium salt, magnesium salt, calcium salt, aluminum salt, zinc salt, iron salt, copper salt, nickel salt, cobalt salt thereof.

The amount of (e) the carboxylic acid and/or the salt thereof is preferably 0.5 part by mass or more, more preferably 1.0 part by mass or more, even more preferably 1.5 parts by mass or more, and is preferably 40 parts by mass or less, more preferably 35 parts by mass or less, even more preferably 30 parts by mass or less, with respect to 100 parts by mass of (a) the base rubber. If the amount of (e) the carboxylic acid and/or the salt thereof is 0.5 part by mass or more, the spherical core has a high degree of the outer-hard and inner-soft structure, and if the amount of (e) the carboxylic acid and/or the salt thereof is 40 parts by mass or less, lowering in the core hardness is suppressed, and thus the resilience of the golf ball is better.

When a carboxylic acid having 1 to 14 carbon atoms and/or a salt thereof is used as (e) the carboxylic acid and/or the salt thereof, the amount of (e) the carboxylic acid and/or the salt thereof is preferably 1.0 part by mass or more, more preferably 1.2 parts by mass or more, even more preferably 1.4 parts by mass or more, and is preferably 20 parts by mass or less, more preferably 18 parts by mass or less, even more preferably 16 parts by mass or less, with respect to 100 parts by mass of (a) the base rubber. When a carboxylic acid having 15 to 30 carbon atoms and/or a salt thereof is used as (e) the carboxylic acid and/or the salt thereof, the amount of (e) the carboxylic acid and/or the salt thereof is preferably 5 parts by mass or more, more preferably 6 parts by mass or more, even more preferably 7 parts by mass or more, and is preferably 40 parts by mass or less, more preferably 35 parts by mass or less, even more preferably 30 parts by mass or less, with respect to 100 parts by mass of (a) the base rubber.

There are cases where the surface of the compound used as the co-crosslinking agent is treated with zinc stearate or the like to improve the dispersibility to the rubber. It should be noted that, in the case of using the co-crosslinking agent whose surface is treated with zinc stearate or the like, the amount of zinc stearate or the like used as a surface treating agent is included in the amount of (e) the carboxylic acid and/or the salt thereof. For example, if 25 parts by mass of zinc acrylate whose surface treatment amount with zinc stearate is 10 mass % is used, the amount of zinc stearate is 2.5 parts by mass and the amount of zinc acrylate is 22.5 parts by mass. Thus, the amount of 2.5 parts by mass is counted as the amount of (e) the carboxylic acid and/or the salt thereof.

(f) Organic Sulfur Compound

The rubber composition preferably further contains (f) an organic sulfur compound. If (f) the organic sulfur compound is contained, the obtained spherical core has better resilience. Examples of (f) the organic sulfur compound include thiophenols, thionaphthols, polysulfides, thiurams, thiocarboxylic acids, dithiocarboxylic acids, sulfenamindes, dithiocarbamates, and thiazoles. From the viewpoint of increasing the hardness distribution of the spherical core, (f) the organic sulfur compound is preferably an organic sulfur compound having a thiol group (—SH) or a metal salt thereof, and more preferably thiophenols, thionaphthols or metal salts thereof. (f) The organic sulfur compound may be used solely or as a mixture of at least two of them.

As (f) the organic sulfur compound, thiophenols and/or metal salts thereof, thionaphthols and/or metal salts thereof, diphenyldisulfides, and thiuramdisulfides are preferable, and 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, pentabromothiophenol, 1-thionaphthol, 2-thionaphthol, diphenyldisulfide, bis(2,6-difluorophenyl)disulfide, bis(2,6-dichlorophenyl)disulfide, bis(2,6-dibromophenyl)disulfide, bis(2,6-diiodophenyl)disulfide, and bis(pentabromophenyl)disulfide are more preferable.

The amount of (f) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the amount of (f) the organic sulfur compound is 0.05 part by mass or more, the obtained golf ball has better resilience, and if the amount of (f) the organic sulfur compound is 5.0 parts by mass or less, the compression deformation amount of the obtained golf ball does not become excessively large, and thus lowering in the resilience is suppressed.

The rubber composition may further contain an additive such as a pigment, a filler for adjusting weight or the like, an antioxidant, a peptizing agent, and a softener, where necessary.

Examples of the pigment blended in the rubber composition include a white pigment, a blue pigment, and a purple pigment. As the white pigment, titanium oxide is preferably used. The type of titanium oxide is not particularly limited, but rutile type is preferably used because of the high opacity. In addition, the amount of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. In addition, examples of the purple pigment include anthraquinone violet, dioxazine violet, and methyl violet.

The amount of the blue pigment is preferably 0.001 part by mass or more, more preferably 0.05 part by mass or more, and is preferably 0.2 part by mass or less, more preferably 0.1 part by mass or less, with respect to 100 parts by mass of (a) the base rubber. If the amount of the blue pigment is less than 0.001 part by mass, blueness is insufficient, and the color looks yellowish. If the amount of the blue pigment exceeds 0.2 part by mass, blueness is excessively strong, and a vivid white appearance is not provided.

The filler blended in the rubber composition is mainly used as a weight adjusting agent for adjusting the weight of the golf ball obtained as a final product, and may be blended where necessary. Examples of the filler include an inorganic filler such as zinc oxide, barium sulfate, calcium carbonate, magnesium oxide, tungsten powder, and molybdenum powder. In particular, the filler is preferably zinc oxide. This is because it is thought that zinc oxide functions as a vulcanization accelerator to enhance the hardness of the constituent member as a whole. The amount of the filler is preferably 0.5 part by mass or more, more preferably 1 part by mass or more, and is preferably 30 parts by mass or less, more preferably 25 parts by mass or less, even more preferably 20 parts by mass or less, with respect to 100 parts by mass of the base rubber. If the amount of the filler is less than 0.5 part by mass, it is difficult to adjust the weight, and if the amount of the filler exceeds 30 parts by mass, the weight proportion of the rubber component is decreased and thus the resilience tends to be lowered.

The amount of the antioxidant is preferably 0.1 part by mass or more and 1 part by mass or less with respect to 100 parts by mass of (a) the base rubber. In addition, the amount of the peptizing agent is preferably 0.1 part by mass or more and 5 parts by mass or less with respect to 100 parts by mass of (a) the base rubber.

The rubber composition may be obtained by mixing and kneading (a) the base rubber, (b) the α,β-unsaturated carboxylic acid having 3 to 8 carbon atoms and/or the metal salt thereof, (c) the crosslinking initiator, and where necessary, other additives. The kneading may be conducted, without any limitation, for example, using a conventional kneading machine such as a kneading roll and a banbury mixer.

The rubber composition may contain a crosslinked rubber powder. The crosslinked rubber is a rubber where chain rubber molecules are crosslinked to form a three dimensional net structure such that no plastic deformation occurs. The crosslinking of chain rubber molecules may be carried out by using a co-crosslinking agent, an organic peroxide, sulfur and the like. The crosslinked rubber powder may be prepared from the rubber composition, or obtained by pulverizing a golf ball core or offcuts produced when preparing a core.

The hardness of the crosslinked rubber powder is preferably 15 or more, more preferably 18 or more, even more preferably 20 or more, and is preferably 65 or less, more preferably 60 or less, even more preferably 58 or less in Shore C hardness. The volume average particle size of the crosslinked rubber powder is preferably 200 μm or more, more preferably 300 μm or more, even more preferably 400 μm or more, and is preferably 800 μm or less, more preferably 750 μm or less, even more preferably 700 μm or less.

The amount of the crosslinked rubber powder is preferably 1 part by mass or more, more preferably 2 parts by mass or more, even more preferably 3 parts by mass or more, and is preferably 40 parts by mass or less, more preferably 30 parts by mass or less, even more preferably 20 parts by mass or less, with respect to 100 parts by mass of (a) the base rubber.

The spherical core may be obtained by molding the kneaded rubber composition in a mold. The temperature for molding the kneaded rubber composition is not particularly limited, and for example, is preferably 120° C. or more, more preferably 150° C. or more, even more preferably 160° C. or more, and is preferably 170° C. or less. If the molding temperature exceeds 170° C., the surface hardness of the core tends to be lowered. In addition, the molding pressure preferably ranges from 2.9 MPa to 11.8 MPa, and the molding time preferably ranges from 10 minutes to 60 minutes.

[Cover Material]

The cover is preferably formed from a resin composition containing a resin component. Examples of the resin component contained in the cover resin composition include an ionomer resin, a thermoplastic polyurethane elastomer having a trade name of "Elastollan (registered trademark)" available from BASF Japan Ltd., a thermoplastic polyamide elastomer having a trade name of "Pebax (registered trademark)" available from Arkema K. K., a thermoplastic polyester elastomer having a trade name of "Hytrel (registered trademark)" available from Du Pont-Toray Co., Ltd., and a thermoplastic styrene elastomer having a trade name of "Rabalon (registered trademark)" available from Mitsubishi Chemical Corporation.

Examples of the ionomer resin include a product obtained by neutralizing at least a part of carboxyl groups in a binary copolymer composed of an olefin and an α,β-unsaturated carboxylic acid having 3 to 8 carbon atoms with a metal ion; a product obtained by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion; and a mixture thereof. The olefin is preferably an olefin having 2 to 8 carbon atoms. Examples of the olefin include ethylene, propylene, butene, pentene, hexene, heptene and octene, and ethylene is particularly preferred. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferred. In addition, examples of the α,β-unsaturated carboxylic acid ester include methyl ester, ethyl ester, propyl ester, n-butyl ester, isobutyl ester of acrylic acid, methacrylic acid, fumaric acid and maleic acid, and acrylic acid ester or methacrylic acid ester is particularly preferred. Among them, as the ionomer resin, a metal ion neutralized product of ethylene-(meth)acrylic acid binary copolymer or a metal ion neutralized product of ethylene-(meth)acrylic acid-(meth)acrylic acid ester ternary copolymer is preferred.

Specific examples of the ionomer resin include "Himilan (registered trademark)" available from Mitsui-Du Pont Polychemicals Co., Ltd., "Surlyn (registered trademark)" available from E.I. du Pont de Nemours and Company, and "Iotek (registered trademark)" available from ExxonMobil Chemical Corporation.

The cover resin composition preferably contains a thermoplastic polyurethane elastomer or an ionomer resin as the resin component. It is preferred that when the ionomer resin is used, a thermoplastic styrene elastomer is also used in combination. The amount of the thermoplastic polyurethane elastomer or ionomer resin in the resin component of the cover resin composition is preferably 50 mass % or more, more preferably 60 mass % or more, even more preferably 70 mass % or more.

The cover resin composition may further contain a pigment component such as a white pigment (titanium oxide) and a blue pigment, a weight adjusting agent, a dispersant, an antioxidant, an ultraviolet absorber, a light stabilizer, a fluorescent material or fluorescent brightener, as long as they do not impair the performance of the golf ball.

[First Resin Composition]

The first resin composition preferably contains (A) a thermoplastic resin, (B) an amphoteric surfactant, and (C) a fatty acid.

((A) Thermoplastic Resin)

(A) The thermoplastic resin preferably includes (A1) a metal ion neutralized product of a binary copolymer composed of an olefin and an α,β-unsaturated carboxylic acid having 3 to 8 carbon atoms (hereinafter, sometimes referred to as "(A1) binary ionomer resin"); and/or (A2) a metal ion neutralized product of a ternary copolymer composed of an olefin, an α,β-unsaturated carboxylic acid having 3 to 8 carbon atoms, and an α,β-unsaturated carboxylic acid ester (hereinafter, sometimes referred to as "(A2) ternary ionomer resin"). (A1) The binary ionomer resin and (A2) the ternary ionomer resin are ionomer resins in which the carboxyl groups of the copolymers are neutralized with a metal ion.

The olefin is preferably an olefin having 2 to 8 carbon atoms. Examples of the olefin include ethylene, propylene, butene, pentene, hexene, heptene and octene, and ethylene is preferred. Examples of the α,β-unsaturated carboxylic acid having 3 to 8 carbon atoms include acrylic acid, methacrylic acid, fumaric acid, maleic acid and crotonic acid, and acrylic acid or methacrylic acid is preferred.

As the α,β-unsaturated carboxylic acid ester, an alkyl ester of an α,β-unsaturated carboxylic acid having 3 to 8 carbon atoms is preferable, an alkyl ester of acrylic acid, methacrylic acid, fumaric acid or maleic acid is more preferable, an alkyl ester of acrylic acid or methacrylic acid is even more preferable. Examples of the alkyl group constituting the ester include methyl, ethyl, propyl, n-butyl, and isobutyl.

As (A1) the binary ionomer resin, a metal ion neutralized product of ethylene-(meth)acrylic acid binary copolymer is preferred. As (A2) the ternary ionomer resin, a metal ion neutralized product of ethylene-(meth)acrylic acid-(meth) acrylic acid ester ternary copolymer is preferred. Herein, (meth)acrylic acid means acrylic acid and/or methacrylic acid.

The amount of the α,β-unsaturated carboxylic acid component having 3 to 8 carbon atoms in the binary copolymer constituting (A1) the binary ionomer resin and the ternary copolymer constituting (A2) the ternary ionomer resin is preferably 4 mass % or more, more preferably 6 mass % or more, even more preferably 8 mass % or more, and is preferably 50 mass % or less, more preferably 30 mass % or less, even more preferably 20 mass % or less, most preferably 15 mass % or less. If the amount of the α,β-unsaturated carboxylic acid component having 3 to 8 carbon atoms is 4 mass % or more, the ionomer resin has better resilience, and if the amount of the α,β-unsaturated carboxylic acid component having 3 to 8 carbon atoms is 30 mass % or less, the ionomer resin has better flexibility.

Examples of the metal ion for neutralizing at least a part of the carboxyl groups in (A1) the binary ionomer resin and/or (A2) the ternary ionomer resin include a monovalent metal ion such as sodium, potassium and lithium; a divalent metal ion such as magnesium, calcium, zinc, barium and cadmium; a trivalent metal ion such as aluminum; and other metal ion such as tin and zirconium. It is preferred that (A1) the binary ionomer resin and (A2) the ternary ionomer resin are neutralized with at least one metal ion selected from the group consisting of $Na^+$, $Mg^{2+}$, $Ca^{2+}$, and $Zn^{2+}$.

The neutralization degree of (A1) the binary ionomer resin and (A2) the ternary ionomer resin is preferably 15 mole % or more, more preferably 20 mole % or more, even more preferably 50 mole % or more, and is preferably 100 mole % or less, more preferably 85 mole % or less. If the neutralization degree is 15 mole % or more, the obtained golf ball has better resilience and durability. On the other hand, if the neutralization degree is 100 mole % or less, the golf ball resin composition has better fluidity (better moldability). It should be noted that the neutralization degree of the ionomer resin may be calculated by the following expression.

Neutralization degree of ionomer resin (mole %)=100×(mole number of neutralized carboxyl groups in copolymer/mole number of all carboxyl groups in copolymer)

As (A1) the binary ionomer resin and (A2) the ternary ionomer resin, an ionomer resin which has been neutralized beforehand may be used; or a mixture obtained by mixing a binary copolymer composed of an olefin and an α,β-unsaturated carboxylic acid having 3 to 8 carbon atoms and/or a ternary copolymer composed of an olefin, an α,β-unsaturated carboxylic acid having 3 to 8 carbon atoms and an α,β-unsaturated carboxylic acid ester with (D) a metal compound which will be described later, may be used. In addition, each of (A1) the binary ionomer resin and (A2) the ternary ionomer resin may be used solely or as a mixture of at least two of them.

Examples of (A1) the binary ionomer resin include Himilan (registered trademark) 1555 (Na), 1557 (Zn), 1605 (Na), 1706 (Zn), 1707 (Na), AM7311 (Mg), AM7329 (Zn) (available from Du Pont-Mitsui Polychemicals Co., Ltd.); Surlyn (registered trademark) 8945 (Na), 9945 (Zn), 8140 (Na), 8150 (Na), 9120 (Zn), 9150 (Zn), 6910 (Mg), 6120 (Mg), 7930 (Li), 7940 (Li), AD8546 (Li) (available from E.I. du Pont de Nemours and Company); and Iotek (registered trademark) 8000 (Na), 8030 (Na), 7010 (Zn), 7030 (Zn) (available from ExxonMobil Chemical Corporation).

Examples of (A2) the ternary ionomer resin include Himilan AM7327 (Zn), 1855 (Zn), 1856 (Na), AM7331 (Na) (available from Du Pont-Mitsui Polychemicals Co., Ltd.); Surlyn 6320 (Mg), 8120 (Na), 8320 (Na), 9320 (Zn), 9320W (Zn), HPF1000 (Mg), HPF2000 (Mg) (available from E.I. du Pont de Nemours and Company); and Iotek 7510 (Zn), 7520 (Zn) (available from ExxonMobil Chemical Corporation).

Examples of the binary copolymer include NUCREL (registered trademark) N1050H, N2050H, N1110H, N0200H (available from Du Pont-Mitsui Polychemicals Co., Ltd.); and Primacor (registered trademark) 59801 (available from The DOW Chemical Company). Examples of the ternary copolymer include NUCREL AN4318, AN4319 (available from Du Pont-Mitsui Polychemicals Co., Ltd.); and Primacor AT310, AT320 (available from The DOW Chemical Company). It should be noted that Na, Zn, Li, Mg and the like described in the parentheses after the trade names indicate metal types of neutralizing metal ions of the ionomer resins.

(A) The thermoplastic resin may further contain other thermoplastic resin than (A1) the binary ionomer resin and (A2) the ternary ionomer resin. In this case, the total amount of (A1) the binary ionomer resin and/or (A2) the ternary ionomer resin in (A) the thermoplastic resin is preferably 50 mass % or more, more preferably 60 mass % or more, even more preferably 70 mass % or more. It is also preferred that (A) the thermoplastic resin consists of (A1) the binary ionomer resin and/or (A2) the ternary ionomer resin.

Examples of the other thermoplastic resin include a thermoplastic olefin copolymer, a thermoplastic polyurethane, a thermoplastic polyamide, a thermoplastic styrene resin, a thermoplastic polyester, a thermoplastic acrylic resin, a thermoplastic polyolefin, a thermoplastic polydiene, and a thermoplastic polyether.

((B) Amphoteric Surfactant)

It is considered that (B) the amphoteric surfactant is taken into the ion association of (A1) the binary ionomer resin and/or (A2) the ternary ionomer resin, and finely disperses the ion association to inhibit crystallization of ethylene chains or weakens constraining of main chains by the ion association. With these actions, the mobility of the molecular chain of the resin composition increases, and thus the resilience of the resin composition increases while retaining the flexibility.

(B) The amphoteric surfactant is not particularly limited, as long as it has a cationic part and an anionic part within the molecule, and has an action of lowering surface tension when being dissolved in water. Examples of (B) the amphoteric surfactant include a betaine type amphoteric surfactant such as an alkylbetaine type, amidobetaine type, imidazoliumbetaine type, alkylsulfobetain type, amidosulfobetain type, and the like; an amidoamino acid type amphoteric surfactant and an alkylamino fatty acid salt; an alkylamine oxide; a β-alanine type amphoteric surfactant and a glycine type amphoteric surfactant; a sulfobetaine type amphoteric surfactant; and a phosphobetaine type amphoteric surfactant. (B) The amphoteric surfactant may be used solely, or at least two of them may be used in combination.

Specific examples of the amphoteric surfactant include dimethyllaurylbetaine, oleyldimethylamino acetic acid betaine (oleylbetaine), dimethyloleylbetaine, dimethylstearylbetaine, stearyldihydroxymethylbetaine, stearyldihydroxyethylbetaine, lauryldihydroxymethylbetaine, lauryldihydroxyethylbetaine, myristyldihydroxymethylbetaine, behenyldihydroxymethylbetaine, palmityldihydroxyethylbetaine, oleyldihydroxymethylbetaine, coconut oil fatty acid amidopropylbetaine, lauric acid amidoalkylbetaine, 2-alkyl-N-carboxyalkylimidazoliumbetaine, lauric acid amidoalkylhydroxysulfobetaine, coconut oil fatty acid amidodialkylhydroxyalkylsulfobetaine, N-alkyl-β-aminopropionic acid salt, N-alkyl-β-iminodipropionic acid salt, alkyldiaminoalkylglycine, alkylpolyaminoalkylglycine, sodium salt of alkylamino fatty acid, N,N-dimethyloctylamine oxide, N,N-dimethyllaurylamine oxide, N,N-dimethylstearylamine oxide, and the like.

The amount of (B) the amphoteric surfactant to be blended is preferably 1 part by mass or more, more preferably 10 parts by mass or more, even more preferably 30 parts by mass or more, and is preferably 90 parts by mass or less, more preferably 80 parts by mass or less, even more preferably 70 parts by mass or less, with respect to 100 parts by mass of a total amount of (A1) the binary ionomer resin and (A2) the ternary ionomer resin. If the amount of (B) the amphoteric surfactant to be blended falls within the above range, the surfactant molecule is easily taken into the ion association of the ionomer resin, thus the mobility of the molecular chain of the ionomer resin increases, and the resilience of the golf ball resin composition increases while retaining the flexibility.

((C) Fatty Acid)

If (C) a fatty acid is contained, the resin composition has better fluidity, and thus it is easy to form a thin layer. (C) The fatty acid is not particularly limited, and a saturated fatty acid or an unsaturated fatty acid may be used. In addition, (C) the fatty acid may be a linear fatty acid or a branched fatty acid. (C) The fatty acid may be used solely or as a mixture of at least two of them.

The number of the carbon atom of (C) the fatty acid is preferably 4 or more, more preferably 12 or more, even more preferably 16 or more, and is preferably 30 or less, more preferably 28 or less, even more preferably 26 or less.

Examples of the saturated fatty acid include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, henicosanoic acid, docosanoic acid, tricosanoic acid, tetracosanoic acid, pentacosanoic acid, hexacosanoic acid, heptacosanoic acid, octacosanoic acid, nonacosanoic acid, and triacontanoic acid.

Examples of the unsaturated fatty acid include butenoic acid, pentenoic acid, hexenoic acid, heptenoic acid, octenoic acid, nonenoic acid, decenoic acid, undecenoic acid, dodecenoic acid, tridecenoic acid, tetradecenoic acid, pentadecenoic acid, hexadecenoic acid, heptadecenoic acid, octadecenoic acid, nonadecenoic acid, icosenoic acid, henicosenoic acid, docosenoic acid, tricosenoic acid, tetracosenoic acid, pentacosenoic acid, hexacosenoic acid, heptacosenoic acid, octacosenoic acid, nonacosenoic acid, and triacontenoic acid.

The amount of (C) the fatty acid to be blended is preferably 10 parts by mass or more, more preferably 30 parts by mass or more, even more preferably 60 parts by mass or more, and is preferably 150 parts by mass or less, more preferably 120 parts by mass or less, even more preferably 100 parts by mass or less, with respect to 100 parts by mass of (A) the thermoplastic resin. If the amount of (C) the fatty acid to be blended is 10 parts by mass or more, the resin composition has better fluidity, and if the amount of (C) the fatty acid to be blended is 150 parts by mass or less, bleeding out of the fatty acid can be suppressed.

As (C) the fatty acid, a fatty acid salt may be used. Examples of the cation component of the fatty acid salt include a metal ion, an ammonium ion, and an organic cation. Examples of the metal ion include a monovalent metal ion such as sodium, potassium, lithium and silver; a divalent metal ion such as magnesium, calcium, zinc, barium, cadmium, copper, cobalt, nickel and manganese; a trivalent metal ion such as aluminum and iron; and other metal ion such as tin, zirconium and titanium. The cation component may be used solely or as a mixture of at least two of them.

((D) Metal Compound)

The first resin composition may further contain (D) a metal compound. If (D) the metal compound is contained, the neutralization degree of (A1) the binary ionomer resin and (A2) the ternary ionomer resin is further increased, and thus the resin composition has better resilience.

(D) The metal compound is not particularly limited, as long as it can neutralize the carboxyl groups, and examples thereof include a metal hydroxide such as magnesium hydroxide, zinc hydroxide, calcium hydroxide, sodium hydroxide, hydroxide lithium, potassium hydroxide and copper hydroxide; a metal oxide such as magnesium oxide, calcium oxide, zinc oxide and copper oxide; and a metal carbonate such as magnesium carbonate, zinc carbonate, calcium carbonate, sodium carbonate, lithium carbonate and potassium carbonate.

The amount of (D) the metal compound to be blended may be appropriately adjusted according to the neutralization degree of (A1) the binary ionomer resin or (A2) the ternary ionomer resin, or the total neutralization degree of the resin composition which will be described later.

The total neutralization degree of the first resin composition is preferably more than 80 mole %, more preferably 85 mole % or more, even more preferably 90 mole % or more, and is preferably 160 mole % or less, more preferably 150 mole % or less, even more preferably 140 mole % or less. If the total neutralization degree is more than 80 mole %, the amount of the ion association increases, and thus the resin composition has better resilience. In addition, if the total neutralization degree is 160 mole % or less, the resin composition has better fluidity. It should be noted that the total neutralization degree of the resin composition is defined by the following formula.

$$\text{Total neutralization degree (mole \%)} = 100 \times [\Sigma(\text{mole number of cation component} \times \text{valence of cation component})] / [\Sigma(\text{mole number of anion component} \times \text{valence of anion component})] \quad \text{[Formula 2]}$$

In the formula, Σ(mole number of cation component× valence of cation component) is a sum of a product obtained by multiplying the mole number of the cation component by the valence of the cation component in the component (A), a product obtained by multiplying the mole number of the cation component by the valence of the cation component in the component (B), and a product obtained by multiplying the mole number of the cation component by the valence of the cation component in the component (C). It should be noted that, when the resin composition further contains the component (D), Σ(mole number of cation component× valence of cation component) further includes a product obtained by multiplying the mole number of the cation component by the valence of the cation component in the component (D).

In the formula, Σ(mole number of anion component× valence of anion component) is a sum of the mole number of the carboxyl group in the component (A), the mole number of the carboxyl group in the component (B), and the mole number of the carboxyl group in the component (C).

It should be noted that, in the above formula, the cation component, cation-forming group, carboxyl group and anion-forming group include a unionized precursor. The amount of the cation component, the amount of the cation-forming group and the amount of the anion-forming group may be determined, for example, by a neutralization titration method.

For example, when the resin composition contains the component (A), component (B), component (C) and component (D), Σ(mole number of cation component× valence of cation component) is a sum of a product obtained by multiplying the mole number of the metal ion by the valence of the metal ion in the component (A), component (B), component (C) and component (D), and a product obtained by multiplying the mole number of the cation-forming group by the valence of the cation-forming group in the component (B); and Σ(mole number of anion component× valence of anion component) is a sum of the mole number of all the carboxyl groups in the component (A), component (B) and component (C).

((F) Filler)

The first resin composition may further contain (F) a filler. As (F) the filler, a conventional filler may be used. Preferable examples of (F) the filler include (F1) an organically modified layered silicate. A layered silicate is a silicate having a layered structure. An organically modified layered silicate is the one that is obtained by exchanging, with an organic onium ion, a part of or all the metal cations originally included between crystal layers in a layered silicate.

The layered silicate is not particularly limited as long as it is a silicate having a layered structure, and examples thereof include: layered silicates of kaolinites such as kaolinite, dickite, halloysite, chrysotile, lizardite, and amesite; layered silicates of smectites such as montmorillonite, beidellite, nontronite, saponite, ferrous saponite, hectorite, sauconite, and stevensite; layered silicates of vermiculites such as dioctahedral vermiculite and trioctahedral vermiculite; layered silicates of micas such as white mica, paragonite, phlogopite, biotite, and lepidolite; layered silicates of brittle micas such as margarite, clintonite, and anandite; and layered silicates of chlorites such as cookeite, sudoite, clinochlore, chamosite, and nimite. These layered silicates may be natural or synthetic, and may be used solely or as a mixture of two or more types. Among them, preferable examples of the layered silicate include: layered silicates of smectites such as montmorillonite, beidellite, nontronite, saponite, ferrous saponite, hectorite, sauconite, and stevensite; layered silicates of vermiculites such as dioctahedral vermiculite and trioctahedral vermiculite; and layered silicates of micas such as white mica, paragonite, phlogopite, biotite, and lepidolite. Montmorillonite and layered silicates of micas are particularly suitable.

Each layer (primary particle) constituting the layered silicate is preferably a nano size fine particle having a thickness of 10 nm or less, and preferably has a plate-like shape whose length and width are both 1 μm or less.

The amount of the organic substance in the organically modified layered silicate is preferably 10 mass % or more, more preferably 15 mass % or more, even more preferably 25 mass % or more, and is preferably 70 mass % or less, more preferably 60 mass % or less, even more preferably 50 mass % or less. If the amount of the organic substance is 10 mass % or more, the organically modified layered silicate has better dispersibility in the resin composition, and if the amount of the organic substance is 70 mass % or less, the durability improvement effect and resilience improvement effect due to the use of the organically modified layered silicate are further enhanced. The amount of the organic substance is an ignition loss at 1000° C.

The organic onium ion used for organically modifying the layered silicate is a cation having a carbon chain. The organic onium ion is not particularly limited, and examples thereof include organic ammonium ions, organic phosphonium ions, and organic sulfonium ions.

As the organic ammonium ion, any one of primary ammonium ion, secondary ammonium ion, tertiary ammonium ion, and quaternary ammonium ion may be used. Examples of the primary ammonium ion include decyl ammonium ion, dodecyl ammonium ion, octadecyl ammonium ion, oleyl ammonium ion, and benzyl ammonium ion. Examples of the secondary ammonium ion include methyl dodecyl ammonium ion and methyl octadecyl ammonium ion. Examples of the tertiary ammonium ion include dimethyl dodecyl ammonium ion and dimethyl octadecyl ammonium ion.

Examples of the quaternary ammonium ion include: benzyl trialkyl ammonium ions such as benzyl trimethyl ammonium ion, benzyl triethyl ammonium ion, benzyl tributyl ammonium ion, benzyl dimethyl dodecyl ammonium ion, and benzyl dimethyl octadecyl ammonium ion; alkyl trimethyl ammonium ions such as trioctyl methyl ammonium ion, trimethyl octyl ammonium ion, trimethyl dodecyl ammonium ion, and trimethyl octadecyl ammonium ion; dimethyl dialkyl ammonium ions such as dimethyl dioctyl ammonium ion, dimethyl didodecyl ammonium ion, and dimethyl dioctadecyl ammonium ion; and oleyl bis(2-hydroxyethyl) methyl ammonium ion.

Other than those described above, examples of the organic ammonium ion also include ammonium ions such as aniline, p-phenylene diamine, α-naphthylamine, p-aminodimethyl aniline, benzidine, pyridine, piperidine, and 6-aminocaproic acid.

Among the ammonium ions described above, a quaternary ammonium ion having a total of 11 to 30 intramolecular carbon atoms is particularly suitable from a standpoint of dispersibility of the layered silicate and formability of ionic bonds. Specific examples thereof include octadecyl ammonium ion, trioctyl methyl ammonium ion, trimethyl octadecyl ammonium ion, benzyl dimethyl dodecyl ammonium ion, benzyl dimethyl octadecyl ammonium ion, dimethyl dioctadecyl ammonium ion, and oleyl bis(2-hydroxyethyl) methyl ammonium ion.

The organically modified layered silicate may be produced by causing a reaction between an organic onium ion and a layered silicate having exchangeable metal ions between layers thereof by a method known in the art. Specific examples of the production method include a method of performing an ion exchange reaction in a polar solvent such as water, methanol, and ethanol; and a method of causing a direct reaction between a liquid or melted ammonium salt and a layered silicate.

The amount of (F1) the organically modified layered silicate in the resin composition is preferably 5 parts by mass or more, more preferably 8 parts by mass or more, even more preferably 10 parts by mass or more, and is preferably 60 parts by mass or less, more preferably 50 parts by mass or less, even more preferably 40 parts by mass or less, with respect to 100 parts by mass of the component (A). If the amount of (F1) the organically modified layered silicate falls within the above range, the physical property improvement effect due to the addition of (F1) the organically modified layered silicate is better, and lowering in toughness is suppressed. If (F1) the organically modified layered silicate is contained in the resin composition, the flexural modulus of the resin composition is enhanced and the spin rate of the golf ball on driver shots is lowered, and thus the golf ball travels a greater flight distance on driver shots.

Examples of the method of molding a cover resin composition into a cover are not particularly limited, and include a method which comprises injection molding the cover composition directly onto the core; and a method which comprises molding the cover composition into a hollow shell, covering the core with a plurality of the hollow shells and performing compression molding (preferably a method which comprises molding the cover composition into a hollow half-shell, covering the core with two of the half-shells and performing compression molding). The golf ball body having the cover formed thereon is ejected from the mold, and is preferably subjected to surface treatments such as deburring, cleaning and sandblast where necessary. In addition, if desired, a mark may be formed.

The total number of dimples formed on the cover is preferably 200 or more and 500 or less. If the total number of dimples is less than 200, the dimple effect is hardly obtained. On the other hand, if the total number of dimples exceeds 500, the dimple effect is hardly obtained because the size of the respective dimple is small. The shape (shape in a plan view) of the dimples formed on the cover includes, without limitation, a circle; a polygonal shape such as a roughly triangular shape, a roughly quadrangular shape, a roughly pentagonal shape and a roughly hexagonal shape; and other irregular shape. These shapes may be employed solely, or at least two of them may be employed in combination.

The golf ball body having the cover formed thereon is ejected from the mold, and is preferably subjected to surface treatments such as deburring, cleaning and sandblast where necessary. In addition, if desired, a paint film or a mark may be formed. The thickness of the paint film is not particularly limited, and is preferably 5 μm or more, more preferably 7 μm or more, and is preferably 50 μm or less, more preferably 40 μm or less, even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

EXAMPLES

Next, the present invention will be described in detail by way of examples. However, the present invention is not limited to the examples described below. Various changes and modifications without departing from the spirit of the present invention are included in the scope of the present invention.

[Evaluation Method]
(1) Measurement of Particle Size

The dry powder sample was set into the dry-type unit of a laser diffraction particle size analyzer (type: LMS-2000e, available from Seishin Enterprise Co., Ltd.), the refractive index of the sample was set as 1.52, and the particle size of the sample was measured. From the obtained volume based frequency distribution graph (the frequency distribution graph obtained by dividing the particle size from 0.02 μm to 2000 μm in the logarithmic plot into 100 parts), the mode particle size was obtained. In addition, from the obtained volume based cumulative distribution graph, d10, the volume ratio ($V_{6-300}$ of the particles having a particle size ranging from 6 μm to 300 μm, the volume ratio ($V_{0-200}$) of the particles having a particle size of 200 μm or less, and the specific surface area were obtained, respectively. It should be noted that, the measured value proximating to the particle size of 300 μm or more was adopted as the cumulative ratio V % (300 μm), the measured value proximating to the particle size of 6 μm or less was adopted as the cumulative ratio V % (6 μm), and the measured value proximating to the particle size of 200 μm or less was adopted as the volume ratio % of the particles having a particle size of 200 μm or less. The specific surface area was calculated from the particle size of each particle which was assumed to have a spherical shape.

(2) Core Hardness (Shore C)

The hardness measured at the surface of the core was adopted as the surface hardness of the core. In addition, the core was cut into two hemispheres to obtain a cut plane, and the hardness at the central point thereof and the hardness at predetermined distances from the central point thereof were measured. It should be noted that the hardness was measured at four points at predetermined distances from the central point of the cut plane, and the average value thereof was adopted as the hardness of the core at the predetermined distance. The hardness was measured with an automatic hardness tester (Digitest II, commercially available from Bareiss company) using a testing device of "Shore C".

(3) Compression Deformation Amount (Mm)

The deformation amount along the compression direction of the core or the golf ball (shrinking amount along the compression direction of the core or the golf ball), when applying a load from an initial load of 98 N to a final load of 1275 N to the core or the golf ball, was measured.

(4) Slab Hardness (Shore D)

Sheets with a thickness of about 2 mm were produced by injection molding the cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D".

(5) Bending Stiffness ($Kgf/m^2$)

Test pieces with a thickness of about 2 mm, a width of 20 mm and a length of 100 mm were produced by heat press molding the golf ball resin composition at 190° C. for 10 minutes. The test pieces were stored at a temperature of 23° C. plus or minus 2° C. and a relative humidity of 50% plus or minus 5% for 14 days. Load scales of the obtained test piece at predetermined bending angles were measured with Olsen stiffness tester (available from Toyo Seiki Seisaku-sho, Ltd.), the bending angles (°) were plotted in the horizontal axis and the load scale readings were plotted in the vertical axis to obtain a linear approximation curve, and the slope of the linear approximation curve was calculated.

Measurement was carried out at a temperature of 23° C. plus or minus 2° C., relative humidity of 50% plus or minus 5%, bending speed of 60°/min, and distance between fulcrums of 50 mm. The bending stiffness was calculated by multiplying the slope value obtained above by 8.7078 and then dividing the obtained product by the cube of thickness (cm) of the test piece. It should be noted that load scales at bending angles of 3°, 6°, 9° and 12° were measured to calculate the bending stiffness.

(6) Deformation Time

A W#1 driver provided with a metal head (XXIO, Shaft: S, loft angel: 11 available from Dunlop Sports Limited) was installed on a swing robot M/C available from Golf Laboratories, Inc. The golf ball was hit at a head speed of 40 m/sec. A high speed video camera (HyperVision (registered trademark) HPV-1, available from Shimadzu Corporation) was used to record the video of the golf ball that was being hit, and the recorded video was analyzed to obtain t1 and t2. It should be noted that, the moment that the golf ball reached a minimum diameter in the flight direction from the contact surface with the club face in the video recorded just right from the side of the hitting, was adopted as the moment that the golf ball reached a maximum deformation amount.

(7) Coefficient of Restitution

A metal cylindrical object with a mass of 198.4 g was allowed to collide with the golf ball at a speed of 40 m/sec, and the speeds of the cylindrical object and the golf ball before and after the collision were measured. Based on these speeds and the mass of each object, coefficient of restitution of each golf ball was calculated. It should be noted that the measurement was conducted using twelve samples for each golf ball, and the average value thereof was adopted as the coefficient of restitution of the golf ball.

(8) Flight Distance (m) and Spin Rate on Driver Shots (Rpm)

A W#1 driver provided with a metal head (XXIO, Shaft: S, loft angel: 11 available from Dunlop Sports Limited) was installed on a swing robot M/C available from Golf Laboratories, Inc. The golf ball was hit at a head speed of 40 m/sec, and the spin rate right after hitting the golf ball and the flight distance (the distance from the launch point to the stop point) were measured. This measurement was conducted twelve times for each golf ball, and the average value thereof was adopted as the measurement value for the golf ball. A sequence of photographs of the hit golf ball were taken for measuring the spin rate right after hitting the golf ball. In Tables 4 and 5, the flight distance and the spin rate of the golf ball on driver shots are shown as the difference from that of the golf ball No. 22.

[Synthesis of Zinc Acrylate]

ZDA-1

A suspension was prepared by adding 1140 g of a solvent and 5 moles of zinc oxide into a jacketed kneader and agitating the obtained mixture. While keeping the temperature inside the kneader at 5° C. to 40° C., 10 moles of acrylic acid was slowly added into the suspension for about 3 hours to cause a reaction between zinc oxide and acrylic acid, and then the temperature inside the kneader was set as 40° C. After finishing the addition of acrylic acid, the reaction was further continued for 4 hours at 40° C. Then, while increasing the temperature of the reaction liquid to 50° C. slowly such that a reduced pressure of 20 Torr was obtained, water generated in the reaction and the solvent were removed by distillation and dried for 5 hours, to obtain 5 moles of zinc acrylate. The above obtained zinc acrylate was air flow classified to obtain zinc acrylate (ZDA-1). The zinc acrylate (ZDA-1) has a mode particle size of 22.9 μm and includes particles having a particle size ranging from 6 μm to 300 μm in a volume ratio of about 70%.

The following apparatuses were used in the air flow classification.

Supplier: table feeder ZGJ-200

Classifier: CLASSIEL N-5 (available from Seishin Enterprise Co., Ltd.)

Collector: bag filter TD-270 (available from Seishin Enterprise Co., Ltd.)

ZDA-2

The above obtained unclassified zinc acrylate was air flow classified to obtain zinc acrylate (ZDA-2). Zinc acrylate (ZDA-2) has a mode particle size of 20.0 μm and a volume ratio of particles having a particle size ranging from 6 μm to 300 μm of about 93%.

The following apparatuses were used in the air flow classification.

Supplier: table feeder ZGJ-200

Classifier: CLASSIEL N-5 (available from Seishin Enterprise Co., Ltd.)

Collector: bag filter TD-270 (available from Seishin Enterprise Co., Ltd.) ZDA-3

The unclassified zinc acrylate obtained in the synthesis of ZDA-1 was air flow classified to obtain zinc acrylate (ZDA-3). The zinc acrylate (ZDA-3) has a mode particle size of 18.7 μm and a volume ratio of particles having a particle size ranging from 6 μm to 300 μm of about 85%.

The following apparatuses were used in the air flow classification.

Supplier: table feeder ZGJ-200

Classifier: CLASSIEL N-01 (available from Seishin Enterprise Co., Ltd.)

Collector: bag filter TD-270 (available from Seishin Enterprise Co., Ltd.)

The properties of ZDA-1 to ZDA-3 are summarized in Table 1. It should be noted that the properties of Sanceler SR and ZD-DA90S are also shown in Table 1 for reference. Sanceler SR is zinc acrylate coated with stearic acid, and ZD-DA90S is a mixture of zinc acrylate and zinc stearate.

TABLE 1

| Material particle | Mode particle size (μm) | d10 (μm) | Volume ratio $V_{6-300}$ (%) | Volume ratio $V_{0-200}$ (%) | Specific surface area (m²/g) |
|---|---|---|---|---|---|
| ZDA-1 | 22.9 | 7.0 | 70.0 | 76.6 | 0.43 |
| ZDA-2 | 20.0 | 10.4 | 93.5 | 92.0 | 0.32 |
| ZDA-3 | 18.7 | 10.5 | 85.5 | 81.5 | 0.29 |
| Sanceler SR | 4.5 | 2.0 | 51.8 | 97.9 | 1.75 |
| ZN-DA90S | 5.6 | 2.1 | 57.8 | 98.0 | 1.65 |

Zinc stearate was added into the obtained ZDA-1, ZDA-2 and ZDA-3, respectively, the resultant mixture was mixed to treat the particle surface of zinc acrylate with zinc stearate (zinc stearate treatment amount: 10 mass %).

[Production of Golf Ball]

(1) Production of Core

The rubber compositions having the formulations shown in Table 2 were kneaded with a kneading roll, and then heat-pressed in upper and lower molds, each having a hemispherical cavity, at 170° C. for 20 minutes to produce the spherical cores having a diameter of 39.8 mm.

TABLE 2

|  |  | Core No. | | | | | | | | |
| --- | --- | --- | --- | --- | --- | --- | --- | --- | --- | --- |
|  |  | a | b | c | d | e | f | g | h | i |
| Rubber composition (parts by mass) | BR730 | 100 | 100 | 100 | 100 | 100 | 100 | 100 | 100 | 100 |
|  | ZDA-1 (coated with zinc stearate) | 39 | — | — | — | — | — | — | — | — |
|  | ZDA-2 (coated with zinc stearate) | — | 39 | 37 | — | — | — | — | — | — |
|  | ZDA-3 (coated with zinc stearate) | — | — | — | 41 | — | — | — | — | — |
|  | Sanceler SR | — | — | — | — | 42 | 30 | — | 30 | — |
|  | ZN-DA90S | — | — | — | — | — | — | 30 | — | 30 |
|  | 2-Thionaphthol | 0.1 | 0.1 | — | 0.1 | 0.1 | 0.1 | 0.1 | 0.1 | 0.1 |
|  | Zinc oxide | 5 | 5 | 5 | 5 | 5 | 5 | 5 | 5 | 5 |
|  | Dicumyl peroxide | 0.8 | 0.8 | 0.8 | 0.8 | 0.8 | 0.8 | 0.8 | 0.8 | 0.8 |
|  | Zinc octanoate | — | — | — | — | 7.5 | — | — | — | — |
|  | Zinc stearate | — | — | — | — | — | 10 | 10 | — | — |
|  | Barium sulfate | *1) | *1) | *1) | *1) | *1) | *1) | *1) | *1) | *1) |
| Hardness distribution (Shore C) | Center hardness Ho | 60.3 | 59.8 | 60.0 | 62.3 | 52.1 | 57.1 | 57.1 | 62.8 | 63.1 |
|  | 12.5% point hardness | 65.9 | 65.2 | 65.7 | 67.2 | 56.7 | 64.0 | 64.0 | 69.5 | 69.0 |
|  | 25.0% point hardness | 69.1 | 68.5 | 69.5 | 69.8 | 62.0 | 68.1 | 68.1 | 72.6 | 73.3 |
|  | 37.5% point hardness | 70.1 | 69.6 | 70.9 | 71.3 | 64.9 | 69.4 | 69.4 | 73.8 | 74.8 |
|  | 50.0% point hardness | 70.2 | 69.8 | 71.6 | 71.6 | 64.8 | 69.4 | 69.4 | 74.0 | 74.5 |
|  | 62.5% point hardness | 71.1 | 71.1 | 72.1 | 73.1 | 73.7 | 70.0 | 70.0 | 73.1 | 73.2 |
|  | 75.0% point hardness | 78.0 | 77.5 | 78.6 | 78.4 | 79.1 | 77.7 | 77.7 | 77.2 | 79.2 |
|  | 87.5% point hardness | 81.4 | 80.9 | 81.3 | 84.3 | 77.0 | 81.8 | 81.8 | 80.8 | 81.8 |
|  | Surface hardness Hs | 87.9 | 87.3 | 87.8 | 91.2 | 87.1 | 86.7 | 86.7 | 86.8 | 87.8 |
|  | Hardness difference (Hs-Ho) | 27.7 | 27.6 | 27.9 | 28.9 | 35.0 | 29.6 | 29.6 | 24.1 | 24.8 |
|  | $R^2$ of approximation curve | 0.91 | 0.92 | 0.93 | 0.91 | 0.96 | 0.92 | 0.92 | 0.87 | 0.88 |
|  | Slope of approximation curve | 0.23 | 0.24 | 0.24 | 0.25 | 0.33 | 0.26 | 0.26 | 0.18 | 0.20 |
| Core compression deformation amount (mm) |  | 3.3 | 3.3 | 3.3 | 3.3 | 3.3 | 3.3 | 3.3 | 3.1 | 3.1 |

*1) The amount was adjusted such that the finally obtained golf ball had a mass of 40.0 g.
BR730: high-cis polybutadiene (cis-1,4 bond amount = 96 mass %, 1,2-vinyl bond amount = 1.3 mass %, Moony viscosity (ML$_{1+4}$ (100° C.)) = 55, molecular weight distribution (Mw/Mn) = 3) available from JSR Corporation
Sanceler SR: zinc acrylate (a product coated with 10 mass % of stearic acid) available from Sanshin Chemical Industry Co., Ltd.
ZN-DA90S: zinc acrylate (a mixture with 10 mass % of zinc stearate) available from Nippon Shokubai Co., Ltd.
2-Thionaphthol: available from Tokyo Chemical Industry Co., Ltd.
Zinc oxide: "Ginrei R" available from Toho Zinc Co., Ltd.
Zinc octanoate: available from Mitsuwa Chemicals Co., Ltd.
Zinc stearate: available from Wako Pure Chemical Industries, Ltd.
Dicumyl peroxide: "PERCUMYL (registered trademark) D" available from NOF Corporation
Barium sulfate: "Barium sulfate BD" available from Sakai Chemical Industry Co., Ltd.

(2) Production of Cover

Next, according to the formulations shown in Table 3, the cover materials were extruded with a twin-screw kneading extruder to prepare the cover compositions in a pellet form. The extruding conditions were a screw diameter of 45 mm, a screw rotational speed of 200 rpm, and screw L/D=35, and the mixture was heated to 150 to 230° C. at the die position of the extruder. The obtained cover composition was injection molded onto the spherical core obtained above to form an inner cover, and then the cover composition was injection molded onto the inner cover to form an outermost cover.

TABLE 3

|  |  | Resin composition No. | | | | | | |
| --- | --- | --- | --- | --- | --- | --- | --- | --- |
|  |  | A | B | C | D | E | F | G |
| Formulation (parts by mass) | NUCREL N1560 | 100 | 100 | 100 | 100 | 100 | 100 | 100 |
|  | Oleic acid | 90 | 90 | 90 | 90 | 90 | 90 | 90 |
|  | Oleylbetaine | 60 | 60 | 60 | 60 | 60 | 60 | 60 |
|  | Magnesium oxide | 18.2 | 18.2 | 18.2 | 18.2 | 18.2 | 18.2 | 18.2 |
|  | S-BEN NO12 | — | 10 | 20 | 30 | 35 | 40 | 45 |
|  | S-BEN NX | — | — | — | — | — | — | — |
|  | S-BEN NO12S | — | — | — | — | — | — | — |
|  | S-BEN E | — | — | — | — | — | — | — |
|  | TPP-treated Kunipia | — | — | — | — | — | — | — |
|  | BEN-GEL A | — | — | — | — | — | — | — |
|  | Elastollan NY82A10 | — | — | — | — | — | — | — |
|  | Titanium oxide | — | — | — | — | — | — | — |
| Properties | Slab hardness (Shore D) | 46 | 52 | 54 | 55 | 55 | 56 | 56 |
|  | Bending stiffness (kgf/cm$^2$) | 510 | 2329 | 2724 | 3432 | 3782 | 4132 | 4482 |
|  | Neutralization degree (%) | 120 | 120 | 120 | 120 | 120 | 120 | 120 |

TABLE 3-continued

|  |  | Resin composition No. | | | | | | |
| --- | --- | --- | --- | --- | --- | --- | --- | --- |
|  |  | H | I | J | K | L | M | N |
| Formulation (parts by mass) | NUCREL N1560 | 100 | 100 | 100 | 100 | 100 | 100 | — |
|  | Oleic acid | 90 | 90 | 90 | 90 | 90 | 90 | — |
|  | Oleylbetaine | 60 | 60 | 60 | 60 | 60 | 60 | — |
|  | Magnesium oxide | 18.2 | 18.2 | 18.2 | 18.2 | 18.2 | 18.2 | — |
|  | S-BEN NO12 | — | — | — | — | — | — | — |
|  | S-BEN NX | 10 | — | — | — | — | 1 | — |
|  | S-BEN NO12S | — | 10 | — | — | — | — | — |
|  | S-BEN E | — | — | 10 | — | — | — | — |
|  | TPP-treated Kunipia | — | — | — | 10 | — | — | — |
|  | BEN-GEL A | — | — | — | — | 10 | — | — |
|  | Elastollan NY82A10 | — | — | — | — | — | — | 100 |
|  | Titanium oxide | — | — | — | — | — | — | 4 |
| Properties | Slab hardness (Shore D) | 52 | 53 | 53 | 51 | 49 | 52 | 29 |
|  | Bending stiffness (kgf/cm$^2$) | 2879 | 1332 | 1532 | 1578 | 1185 | 2879 | — |
|  | Neutralization degree (%) | 120 | 120 | 120 | 120 | 120 | 120 | — |

NUCREL (registered trademark) N1560: ethylene-methacrylic acid copolymer (acid component amount: 15 mass %, melt flow rate (190° C., 2.16 kgf): 60 g/10 min, Shore D hardness: 53) available from Du Pont-Mitsui Polychemicals Co., Ltd.
Oleic acid: available from Tokyo Chemical Industry Co., Ltd.
Oleylbetaine: a purified product obtained by removing water and salt from "Chembetaine OL" available from The Lubrizol Corporation
Magnesium hydroxide: available from Wako Pure Chemical Industries, Ltd.
S-BEN NO12: quaternary ammonium-treated montmorillonite (quaternary ammonium cation: a mixture of dimethyl distearyl ammonium ion and oleyl bis(2-hydroxyethyl) methyl ammonium ion in a mass ratio of 1:1, organic substance amount: 38.8 mass %) available from Hojun Co., Ltd.
S-BEN NX: quaternary ammonium-treated montmorillonite (quaternary ammonium cation: dimethyl distearyl ammonium ion, organic substance amount: 41.8 mass %) available from Hojun Co., Ltd.
S-BEN NO12S: quaternary ammonium-treated montmorillonite (quaternary ammonium cation: oleyl bis(2-hydroxyethyl) methyl ammonium ion, organic substance amount: 31.5 mass %) available from Hojun Co., Ltd.
S-BEN E: quaternary ammonium-treated montmorillonite (quaternary ammonium cation: trimethyl stearyl ammonium ion, organic substance amount: 25.6 mass %) available from Hojun Co., Ltd.
TPP-treated Kunipia: organically treated montmorillonite (organic cation: tetraphenyl phosphonium ion) available from Kunimine Industries Co., Ltd.
BEN-GEL A: montmorillonite available from Hojun Co., Ltd.
Elastollan (registered trademark) NY82A10: thermoplastic polyurethane elastomer available from BASF Japan Ltd.

Evaluation results for each golf ball are shown in Tables 4 and 5.

TABLE 4

|  |  | Golf ball No. | | | | | | |
| --- | --- | --- | --- | --- | --- | --- | --- | --- |
|  |  | 1 | 2 | 3 | 4 | 5 | 6 | 7 |
| Core | Core No. | f | f | f | f | f | f | f |
|  | Diameter (mm) | 39.8 | 39.8 | 39.8 | 39.8 | 39.8 | 39.8 | 39.8 |
|  | Hardness difference (Hs-Ho) (Shore C) | 29.6 | 29.6 | 29.6 | 29.6 | 29.6 | 29.6 | 29.6 |
|  | $R^2$ of approximation curve | 0.92 | 0.92 | 0.92 | 0.92 | 0.92 | 0.92 | 0.92 |
|  | Slope of approximation curve | 0.26 | 0.26 | 0.26 | 0.26 | 0.26 | 0.26 | 0.26 |
|  | Compression deformation amount (mm) | 3.3 | 3.3 | 3.3 | 3.3 | 3.3 | 3.3 | 3.3 |
| Inner cover | Resin composition No. | B | C | D | F | H | I | J |
|  | Thickness (mm) | 1.0 | 1.0 | 1.0 | 1.0 | 1.0 | 1.0 | 1.0 |
|  | Slab hardness (Shore D) | 52 | 54 | 55 | 56 | 52 | 53 | 53 |
|  | Bending stiffness (kgf/cm$^2$) | 2329 | 2724 | 3432 | 4132 | 2879 | 1332 | 1532 |
|  | Neutralization degree (%) | 120 | 120 | 120 | 120 | 120 | 120 | 120 |
| Outer cover | Resin composition No. | N | N | N | N | N | N | N |
|  | Thickness (mm) | 0.5 | 0.5 | 0.5 | 0.5 | 0.5 | 0.5 | 0.5 |
| Properties | Compression deformation amount (mm) | 2.7 | 2.7 | 2.7 | 2.7 | 2.7 | 2.7 | 2.7 |
|  | Time    t2/t1 | 1.40 | 1.38 | 1.36 | 1.37 | 1.23 | 1.23 | 1.18 |
|  | t1 (μsec) | 200 | 210 | 210 | 205 | 215 | 215 | 220 |
|  | t2 (μsec) | 280 | 290 | 285 | 280 | 265 | 265 | 260 |
| Evaluation | Coefficient of restitution | 0.003 | 0.002 | 0.001 | 0.000 | 0.003 | 0.003 | 0.003 |
|  | Spin rate on driver shots (rpm) | −60 | −60 | −60 | −60 | −60 | −60 | −60 |
|  | Flight distance on driver shots (m) | 3.0 | 2.5 | 2.5 | 2.0 | 3.0 | 3.0 | 3.0 |

|  |  | Golf ball No. | | | | | |
| --- | --- | --- | --- | --- | --- | --- | --- |
|  |  | 8 | 9 | 10 | 11 | 12 | 13 |
| Core | Core No. | f | f | e | e | e | e |
|  | Diameter (mm) | 39.8 | 39.8 | 39.8 | 39.8 | 39.8 | 39.8 |
|  | Hardness difference (Hs-Ho) (Shore C) | 29.6 | 29.6 | 35.0 | 35.0 | 35.0 | 35.0 |

TABLE 4-continued

|  |  |  |  |  |  |  |  |
|---|---|---|---|---|---|---|---|
|  | $R^2$ of approximation curve | 0.92 | 0.92 | 0.96 | 0.96 | 0.96 | 0.96 |
|  | Slope of approximation curve | 0.26 | 0.26 | 0.33 | 0.33 | 0.33 | 0.33 |
|  | Compression deformation amount (mm) | 3.3 | 3.3 | 3.3 | 3.3 | 3.3 | 3.3 |
| Inner cover | Resin composition No. | K | L | C | D | E | G |
|  | Thickness (mm) | 1.0 | 1.0 | 1.0 | 1.0 | 1.0 | 1.0 |
|  | Slab hardness (Shore D) | 51 | 49 | 54 | 55 | 55 | 56 |
|  | Bending stiffness (kgf/cm$^2$) | 1578 | 1185 | 2724 | 3432 | 3782 | 4482 |
|  | Neutralization degree (%) | 120 | 120 | 120 | 120 | 120 | 120 |
| Outer cover | Resin composition No. | N | N | N | N | N | N |
|  | Thickness (mm) | 0.5 | 0.5 | 0.5 | 0.5 | 0.5 | 0.5 |
| Properties | Compression deformation amount (mm) | 2.7 | 2.7 | 2.8 | 2.8 | 2.8 | 2.8 |
|  | Time t2/t1 | 1.13 | 1.13 | 1.33 | 1.23 | 1.18 | 1.18 |
|  | t1 (μsec) | 225 | 225 | 210 | 215 | 220 | 220 |
|  | t2 (μsec) | 255 | 255 | 280 | 265 | 260 | 260 |
| Evaluation | Coefficient of restitution | 0.003 | 0.003 | 0.008 | 0.009 | 0.010 | 0.011 |
|  | Spin rate on driver shots (rpm) | −60 | −60 | −125 | −125 | −125 | −125 |
|  | Flight distance on driver shots (m) | 3.0 | 3.0 | 4.5 | 5.0 | 5.5 | 6.0 |

TABLE 5

|  |  | Golf ball No. | | | | | | |
|---|---|---|---|---|---|---|---|---|
|  |  | 14 | 15 | 16 | 17 | 18 | 19 | 20 |
| Core | Core No. | a | b | c | d | a | a | a |
|  | Diameter (mm) | 39.8 | 39.8 | 39.8 | 39.8 | 39.8 | 39.8 | 39.8 |
|  | Hardness difference (Hs-Ho) (Shore C) | 27.7 | 27.6 | 27.9 | 28.9 | 27.7 | 27.7 | 27.7 |
|  | $R^2$ of approximation curve | 0.91 | 0.92 | 0.93 | 0.91 | 0.91 | 0.91 | 0.91 |
|  | Slope of approximation curve | 0.23 | 0.24 | 0.24 | 0.25 | 0.23 | 0.23 | 0.23 |
|  | Compression deformation amount (mm) | 3.3 | 3.3 | 3.3 | 3.3 | 3.3 | 3.3 | 3.3 |
| Inner cover | Resin composition No. | A | A | A | A | C | D | E |
|  | Thickness (mm) | 1.0 | 1.0 | 1.0 | 1.0 | 1.0 | 1.0 | 1.0 |
|  | Slab hardness (Shore D) | 46 | 46 | 46 | 46 | 54 | 55 | 55 |
|  | Bending stiffness (kgf/cm$^2$) | 510 | 510 | 510 | 510 | 2724 | 3432 | 3782 |
|  | Neutralization degree (%) | 120 | 120 | 120 | 120 | 120 | 120 | 120 |
| Outer cover | Resin composition No. | N | N | N | N | N | N | N |
|  | Thickness (mm) | 0.5 | 0.5 | 0.5 | 0.5 | 0.5 | 0.5 | 0.5 |
| Properties | Compression deformation amount (mm) | 2.8 | 2.8 | 2.8 | 2.8 | 2.8 | 2.8 | 2.8 |
|  | Time t2/t1 | 1.30 | 1.35 | 1.30 | 1.30 | 1.37 | 1.37 | 1.33 |
|  | t1 (μsec) | 230 | 230 | 235 | 230 | 215 | 215 | 215 |
|  | t2 (μsec) | 300 | 310 | 305 | 300 | 295 | 295 | 285 |
| Evaluation | Coefficient of restitution | 0.011 | 0.009 | 0.000 | 0.008 | 0.010 | 0.012 | 0.014 |
|  | Spin rate on driver shots (rpm) | −110 | −100 | −100 | −80 | −110 | −110 | −110 |
|  | Flight distance on driver shots (m) | 3.0 | 4.5 | 2.5 | 3.0 | 4.5 | 4.5 | 5.0 |

|  |  | Golf ball No. | | | | | |
|---|---|---|---|---|---|---|---|
|  |  | 21 | 22 | 23 | 24 | 25 | 26 |
| Core | Core No. | a | h | i | g | f | e |
|  | Diameter (mm) | 39.8 | 39.8 | 39.8 | 39.8 | 39.8 | 39.8 |
|  | Hardness difference (Hs-Ho) (Shore C) | 27.7 | 24.1 | 24.8 | 29.6 | 29.6 | 35.0 |
|  | $R^2$ of approximation curve | 0.91 | 0.87 | 0.88 | 0.92 | 0.92 | 0.96 |
|  | Slope of approximation curve | 0.23 | 0.18 | 0.20 | 0.26 | 0.26 | 0.33 |
|  | Compression deformation amount (mm) | 3.3 | 3.1 | 3.1 | 3.3 | 3.3 | 3.3 |
| Inner cover | Resin composition No. | G | A | A | A | M | A |
|  | Thickness (mm) | 1.0 | 1.0 | 1.0 | 1.0 | 1.0 | 1.0 |
|  | Slab hardness (Shore D) | 56 | 46 | 46 | 46 | 47 | 46 |
|  | Bending stiffness (kgf/cm$^2$) | 4482 | 510 | 510 | 510 | 560 | 510 |
|  | Neutralization degree (%) | 120 | 120 | 120 | 120 | 120 | 120 |
| Outer cover | Resin composition No. | N | N | N | N | N | N |
|  | Thickness (mm) | 0.5 | 0.5 | 0.5 | 0.5 | 0.5 | 0.5 |
| Properties | Compression deformation amount (mm) | 2.8 | 2.7 | 2.7 | 2.7 | 2.7 | 2.8 |
|  | Time t2/t1 | 1.33 | 1.04 | 1.04 | 1.04 | 1.04 | 1.04 |
|  | t1 (μsec) | 215 | 250 | 250 | 250 | 250 | 250 |
|  | t2 (μsec) | 285 | 260 | 260 | 260 | 260 | 260 |

TABLE 5-continued

| Evaluation | Coefficient of restitution | 0.016 | 0.000 | 0.000 | 0.000 | 0.000 | 0.000 |
|---|---|---|---|---|---|---|---|
| | Spin rate on driver shots (rpm) | −110 | 0 | 5 | −60 | −60 | −125 |
| | Flight distance on driver shots (m) | 5.0 | 0.0 | 0.0 | 1.0 | 1.0 | 3.0 |

The golf balls No. 1 to 21 have a time ratio (t2/t1) of 1.05 or more. All of these golf balls have excellent resilience compared to the golf ball No. 22.

This application is based on Japanese patent application No. 2015-157464 filed on Aug. 7, 2015, the contents of which are hereby incorporated by reference.

The invention claimed is:

1. A golf ball comprising a spherical core and a cover covering the spherical core, wherein
the spherical core is formed from a rubber composition containing:
(a) a base rubber,
(b) a co-crosslinking agent which is an α,β-unsaturated carboxylic acid having 3 to 8 carbon atoms and/or a metal salt thereof and which has a mode particle size of larger than 10 μm and 50 μm or less and includes particles having a particle size ranging from 6 μm to 300 μm in a volume ratio of 60% or more in a volume based particle size distribution graph, and
(c) a crosslinking initiator, and
the golf ball, upon being hit by a driver at a head speed of 40 m/sec in a hitting test, exhibits a ratio (t2/t1) of a time (t2) to a time (t1) of 1.05 or more, wherein the time (t1) is the amount of time from the moment that the driver begins to contact the golf ball to the moment that the golf ball reaches its maximum deformation amount, and the time (t2) is the amount of time from the moment that the golf ball reaches its maximum deformation amount to the moment that the golf ball leaves the driver.

2. The golf ball according to claim 1, wherein the total amount of the time (t1) and the time (t2) ranges from 200 sec to 700 μsec.

3. The golf ball according to claim 1, wherein the golf ball has a compression deformation amount (deformation amount along the compression direction thereof) ranging from 2.0 mm to 4.0 mm, when applying a load from an initial load of 98 N to a final load of 1275 N to the golf ball.

4. The golf ball according to claim 1, wherein the spherical core has a hardness difference (Hs−Ho) between a surface hardness (Hs) and a center hardness (Ho) thereof ranging from 15 to 50 in Shore C hardness.

5. The golf ball according to claim 1, wherein the spherical core has a compression deformation amount (deformation amount along the compression direction thereof) ranging from 2.0 mm to 6.0 mm, when applying a load from an initial load of 98 N to a final load of 1275 N to the spherical core.

6. The golf ball according to claim 1, wherein the cover is formed from a first cover resin composition having a bending stiffness in a range from 500 kgf/cm² to 6000 kgf/cm².

7. The golf ball according to claim 1, wherein the cover is formed from a first cover resin composition containing an ionomer resin and an organically modified layered silicate.

8. The golf ball according to claim 6, wherein the first cover resin composition has a slab hardness ranging from 35 to 65 in Shore D hardness.

9. The golf ball according to claim 1, wherein the time (t1) ranges from 150 μsec to 400 μsec and the time (t2) ranges from 150 μsec to 450 μsec.

10. The golf ball according to claim 1, wherein the spherical core has a surface hardness ranging from 75 to 95 in Shore C hardness and a center hardness ranging from 35 to 65 in Shore C hardness.

11. The golf ball according to claim 1, wherein (b) the α,β-unsaturated carboxylic acid having 3 to 8 carbon atoms and/or the metal salt thereof is a powder of particles having a particle size of 200 μm or less in a volume ratio of 75% or more in a volume based particle size distribution graph.

12. The golf ball according to claim 1, wherein (b) the α,β-unsaturated carboxylic acid having 3 to 8 carbon atoms and/or the metal salt thereof is a powder having a specific surface area ranging from 0.1 m²/g to 1.5 m²/g.

13. The golf ball according to claim 1, wherein the rubber composition further contains (e) a carboxylic acid and/or a salt thereof and (f) an organic sulfur compound.

14. The golf ball according to claim 1, wherein the cover is composed of at least two layers, and an outermost cover is formed from a second resin composition and at least one layer of the cover other than the outermost cover is formed from a first cover resin composition.

15. The golf ball according to claim 14, wherein the first cover resin composition contains (A) a thermoplastic resin, (B) an amphoteric surfactant, and (C) a fatty acid.

16. The golf ball according to claim 15, wherein the first cover resin composition further contains (D) a metal compound for neutralizing carboxyl groups of (A) the thermoplastic resin containing an ionomer resin.

17. The golf ball according to claim 16, wherein the first cover resin composition further contains (F) a filler.

18. The golf ball according to claim 14, wherein the first cover resin composition has a bending stiffness in a range from 500 kgf/cm² to 6000 kgf/cm² and a slab hardness ranging from 35 to 65 in Shore D hardness.

19. The golf ball according to claim 14, wherein the second cover resin composition has a slab hardness in a range from 10 to 45 in Shore D hardness.

20. The golf ball according to claim 15, wherein the first cover resin composition further contains (F1) an organically modified layered silicate as (F) a filler.

* * * * *